United States Patent [19]

Mortensen et al.

[11] Patent Number: 5,481,735

[45] Date of Patent: Jan. 2, 1996

[54] METHOD FOR MODIFYING PACKETS THAT MEET A PARTICULAR CRITERIA AS THE PACKETS PASS BETWEEN TWO LAYERS IN A NETWORK

[75] Inventors: Craig Mortensen, Sunnyvale; Logan Roots, Redwood City; Klaus Strelau, Saratoga, all of Calif.

[73] Assignee: Apple Computer, Inc., Cupertino, Calif.

[21] Appl. No.: 999,281

[22] Filed: Dec. 28, 1992

[51] Int. Cl.$^6$ .......................... G06F 13/14; H04L 12/00; H04L 12/28

[52] U.S. Cl. .................. 395/200.1; 364/DIG. 1; 364/241.8; 364/284.3; 364/242.94; 364/284.4; 364/514 R; 370/17; 370/60; 370/85.4; 370/94.1

[58] Field of Search .................. 370/60.17, 85.4, 370/94.1; 395/200, 325, 500, 800; 371/32

[56] References Cited

U.S. PATENT DOCUMENTS

| | | | |
|---|---|---|---|
| 4,718,060 | 1/1988 | Oguchi et al. | 370/85 |
| 4,799,215 | 1/1989 | Suzuki | 370/60 |
| 4,922,486 | 5/1990 | Lidinsky et al. | 370/60 |
| 4,939,726 | 7/1990 | Flammer et al. | 370/94.1 |
| 5,014,221 | 5/1991 | Mogul | 395/113 |
| 5,101,402 | 3/1992 | Chiu et al. | 370/17 |
| 5,107,456 | 4/1992 | Schuur | 395/325 |
| 5,115,432 | 5/1992 | Haas | 370/94.1 |
| 5,115,433 | 5/1992 | Baran et al. | 370/94.3 |
| 5,124,984 | 6/1992 | Engel | 370/94.1 |
| 5,136,716 | 8/1992 | Harvey et al. | 395/800 |
| 5,150,464 | 9/1992 | Sidhu et al. | 395/200 |
| 5,168,497 | 12/1992 | Ozaki et al. | 370/94.1 |
| 5,251,215 | 10/1993 | Dravida et al. | 370/94.1 |
| 5,289,469 | 2/1994 | Tanaka | 370/94.1 |

OTHER PUBLICATIONS

Bruce Schneier, "Fire Walls' Stand As a Protectant Between Trouble and the Network," *MACWEEK*, pp. 24 and 28, Jun. 8, 1992.

Apple Computer, Inc., *Macintosh®, Apple Talk® Connections Programmer's Guide*, 1990.

G. S. Sidhu, R. F. Andrews, A. B. Oppenheimer, *Inside Apple Talk®, Second Edition*, Table of Contents, Addison–Wesley Publishing Company, Inc., 1990.

*Primary Examiner*—Krisna Lim
*Attorney, Agent, or Firm*—Blakely, Sokoloff, Taylor & Zafman

[57] ABSTRACT

A method and apparatus in a computer system coupled to a network for altering information in said network by the computer system. A process is inserted between two lower layers of the ISO/OSI model. The process then receives a packet from a first layer of the ISO/OSI model, and determines whether a criteria comprising a set of conditions has been determined in the packet. If any of the set of criteria is present in the packet then the packet is transformed into a modified packet according to a predefined action. Then, the modified packet is transmitted to a second layer of the ISO/OSI model. In different embodiments the layers may be either higher or lower relative to one another in order that incoming or outgoing packets be modified. The method may also be performed under control of a user-generated script, or by remote control from another node. The method may also employ user-generated processes for condition (criteria) checking and/or modifications.

17 Claims, 24 Drawing Sheets

METHOD FOR MODIFYING PACKETS THAT MEET A PARTICULAR CRITERIA AS THE PACKETS PASS BETWEEN TWO LAYERS IN A NETWORK

BACKGROUND OF THE INVENTION

1. Field of the Invention

The present invention relates to networking systems. Particularly, the present invention relates to modification of packets in a networking system for a variety of applications, including testing.

2. Background Information

Modern computer systems, especially personal computers, have gained increasing capabilities in recent years for communication. Specifically, networking technology has allowed the proliferation of such techniques as file sharing, message passing, and program linking in order to provide additional capabilities. For example, the proliferation of electronic mail has been an increased application for modern personal computer systems. Such electronic mail systems allow large numbers of users of computer systems to be linked together and communicate via messages sent over the mail system.

File sharing allows the files on one user's fixed-media device of his computer to be shared with another user's computer system. Thus, a computer system upon which files are shared becomes a "server." In this manner, data and files may be transferred to and from various systems in the network. Data and files are transmitted between computers using discrete data known as "packets." These packets follow a very specific syntax specified by the ISO-OSI reference model (Internal Standards Organization which developed and published a standard networking framework known as the Open Systems Interconnection reference model) in some computer systems.

It has been increasingly a requirement in networking systems to provide means for testing the reliability of such systems. While a network is operating, various failures may occur in the network due to various operating conditions. This causes packets transmitted in the system to become distorted or changed in some other way. For example, hardware failures may prevent a packet from traversing from one area of a network to another. In another situation, such a hardware failure may result in data loss or packet transmission errors, such as delays in transmission, multiple transmissions of same packets, packets arriving out of order, or data errors. Network traffic and/or failures may also affect the network and cause transmission errors. In fact, depending upon the failures which occur in a network, any combination of these errors may occur where packets are distorted in the network. Thus, to ensure the integrity of such systems and the related control hardware and software used in the network, testing which operates to simulate all possible error conditions which may occur is desirable. To date, no tools have existed in the personal computer industry which allow such errors to be simulated.

SUMMARY AND OBJECTS OF THE INVENTION

One of the objects of the present invention is to provide a means for testing in a networking computer system.

Another of the objects of the present invention is to provide a means for modifying data transmitted in a networking system to simulate errors which may occur in such a networking system.

Another of the objects of the present invention is to provide a means for altering data contained within packets transmitted in a networking system.

Another of the objects of the present invention is to provide a means for delaying packets in a networking system.

These and other objects of the present invention are provided for by a method and apparatus in a computer system coupled to a network for altering information in said network by the computer system. A process is inserted between two lower layers of the ISO/OSI model. The process then receives a packet from a first layer of the ISO/OSI model, and determines whether a criteria comprising a set of conditions has been determined in the packet. If any of the set of criteria is present in the packet then the packet is transformed into a modified packet according to a predefined action. Then, the modified packet is transmitted to a second layer of the ISO/OSI model. In different embodiments the layers may be either higher or lower relative to one another in order that incoming or outgoing packets be modified. In a preferred embodiment, modification to the packet includes replacing data in said packet, truncating the packet, increasing the length or the packet, retransmitting the packet N number of times on the network, etc. Intervals may also be specified between retransmissions of the packet in this example, or the number of times the packet is retransmitted may be specified. The method may also comprise modifying data contained in each of the defined protocol traits of the ISO/OSI protocol stacks. The method may be performed on a plurality of network ports selected by a user. The method may also be performed under control of a user-generated script, or by remote control from another node. The method may also employ user-defined processes for condition (criteria) checking and/or modifications.

BRIEF DESCRIPTION OF THE DRAWINGS

The present invention is illustrated by way of example and not limitation in the figures of the accompanying in which like references indicate like elements and in which:

FIG. 16b shows a portion of the process flow diagram illustrated in FIG. 16a.

FIG. 16c shows a portion of the process flow diagram illustrated in FIG. 16a.

DETAILED DESCRIPTION

A method and apparatus for modifying packets in a computer system network is described. In the following description, for the purposes of explanation, specific fields, data, and user interfaces have been set forth in order to provide a thorough understanding of the :present invention. However, it will be apparent to one skilled in the art that the present invention may be practiced without these specific details. In other instances, well-known circuits and devices are shown in block diagram form in order to not unnecessarily obscure the present invention.

Figure 1:
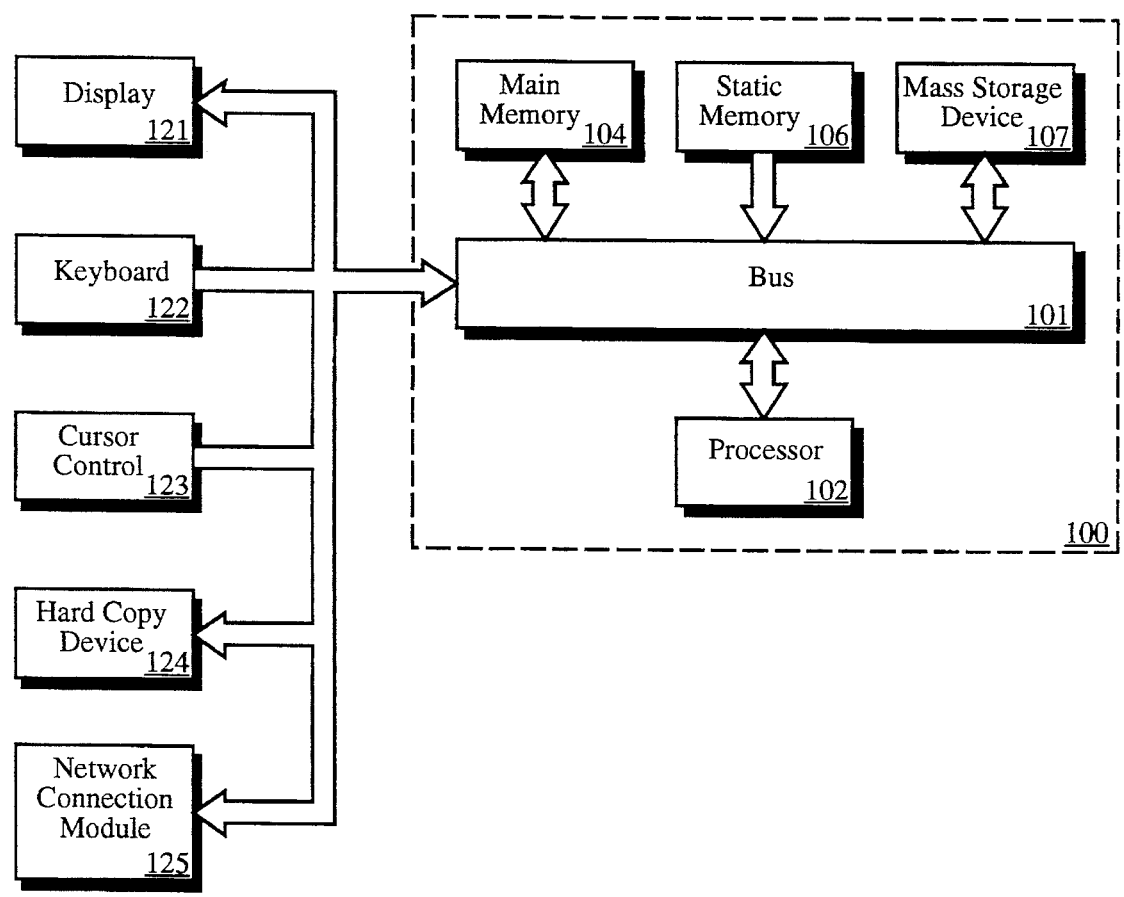
FIG. 1 shows a block diagram of a computer system upon which the methods and apparatus of the present invention may be implemented.

Referring to FIG. 1, the computer system upon which the preferred embodiment of the present invention is implemented is shown as 100. 100 comprises a bus or other communication means 101 for communicating information, and a processing means 102 coupled with bus 101 for processing information. System 100 further comprises a random access memory (RAM) or other dynamic storage device 104 (referred to as main memory), coupled to bus 101 for storing information and instructions to be executed by processor 102. Main memory 104 also may be used for storing temporary variables or other intermediate information during execution of instructions by processor 102. Computer system 100 also comprises a read only memory (ROM) and/or other static storage device 106 coupled to bus 101 for storing static information and instructions for processor 102, and a mass storage device 107 such as a magnetic disk or optical disk and its corresponding disk drive. Mass storage device 107 is coupled to bus 101 for storing information and instructions. Computer system 100 may further be coupled to a display device 121, such as a cathode ray tube (CRT) coupled to bus 101 for displaying information to a computer user. An alphanumeric input device 122, including alphanumeric and other keys, may also be coupled to bus 101 for communicating information and command selections to processor 102. An additional user input device is cursor control 123, such as a mouse, a trackball, stylus, or cursor direction keys, coupled to bus 101 for communicating direction information and command selections to processor 102, and for controlling cursor movement on display 121. Another device which may be coupled to bus 101 is hard copy device 124 which may be used for printing instructions, data, or other information on a medium such as paper, film, or similar types of media. Lastly, computer system 100 may be coupled to a network connection module 125 for communication with other computers, network routers, or other peripheral devices such as shared printers, modems, etc.

In the preferred embodiment, computer system 100 is one of the Macintosh® family of personal computers, such as the Macintosh® Performa™ or Macintosh® Quadra™ manufactured by Apple® Computer, Inc. of Cupertino, Calif. (Apple, Macintosh, Performa, and Quadra are trademarks of Apple Computer, Inc.). Processor 102 is one of the 68000 family of microprocessors manufactured by Motorola, Inc., of Schaumburg, Ill., such as the 68030 or 68040 microprocessor.

In a preferred embodiment, network connection module 125 is used for coupling the computer system to other computer systems in a typical network environment. Network connection module may be any number of hardware devices commercially available, however, for the purposes of the remainder of this discussion, network connection module 125 is the standard built-in AppleTalk-brand connection module available from Apple Computer, Inc. of Cupertino, Calif. Note that, in other embodiments, the computer system may contain additional add-in cards or other built-in networking features which provide more high performance networking capabilities, such as Ethernet, Token Ring, TCP/IP, or other networking standards which are commercially available in the industry. For connecting to a Macintosh®-brand personal computer, many such networking peripheral integrated circuit cards are commercially available which may be inserted into an expansion slot in the computer system and may be used for communicating over a higher performance networking medium. It can be appreciated by one skilled in the art that any type of network peripheral adapter may be used as network connection module 125.

The underlying routines which provide the basis for the functioning of the preferred embodiment, and additional user expansion of these functions, is provided by routines written in the "C"-brand programming language and inline 68000 assembly language. Routines are compiled using the Think C brand compiler available from Symantec Corporation of Cupertino, Calif. which generates computer object code for Motorola 68000 family central processing units operating in the Macintosh® brand operating system. Examples of the data structures and messages used in the preferred embodiment are shown in the figures attached to this patent application. These will be discussed and explained in more detail below.

Before discussing the preferred embodiment in detail, a brief overview of the user interface used by the preferred embodiment. The preferred embodiment uses a "windowing" or graphical user interface (GUI) operating system wherein selections are performed using a cursor control device such as 123 shown in FIG. 1. Typically, an item is "selected" on a computer system display such as 121 using cursor control device 123 by depressing a selection button which is typically mounted on the cursor control device such as 123. Therefore, in order to run a given program, the user merely selects area on a computer display by "double clicking" the area on the screen. A "double click" is an operation comprising two rapid depressings of the mouse or other selection device indicating to the operating system that the program is desired to be run. Further, "pull-down" menus are used in the preferred embodiment. A pull-down menu is a selection which is accessible by depressing the selection button when the cursor is pointing at a menu bar (typically at the top of a computer screen), and "dragging" (moving cursor control device 123 while the selection button is depressed) until the selection the user wishes to access is reached on the pull-down menu. An item is indicated as being selected on a pull-down menu when the item is displayed in "reverse video" or white text on a black background. The selection is performed by the user releasing the selection button when the selection he wishes to make is displayed in this reverse video format. Other selections and options are available using standard GUI functions.

Note also that GUI's may incorporate other selection devices, such as a stylus or "pen" which may be interactive with a display. Thus, a user may "select" regions of the GUI on the display by touching the stylus against the display. In this instance, such displays may be touch or light-sensitive to detect where the selection occurs. Such devices may thus detect selection position and the selection as a single operation instead of the "point and click," as in a system incorporating a mouse or trackball. Such a system may also lack a keyboard such as 122 wherein all interface is provided via the stylus as a writing instrument (like a pen) and the written text is interpreted using optical character recognition (OCR) techniques. These types of systems may also benefit from the methods and apparatus described herein.

Figure 2:
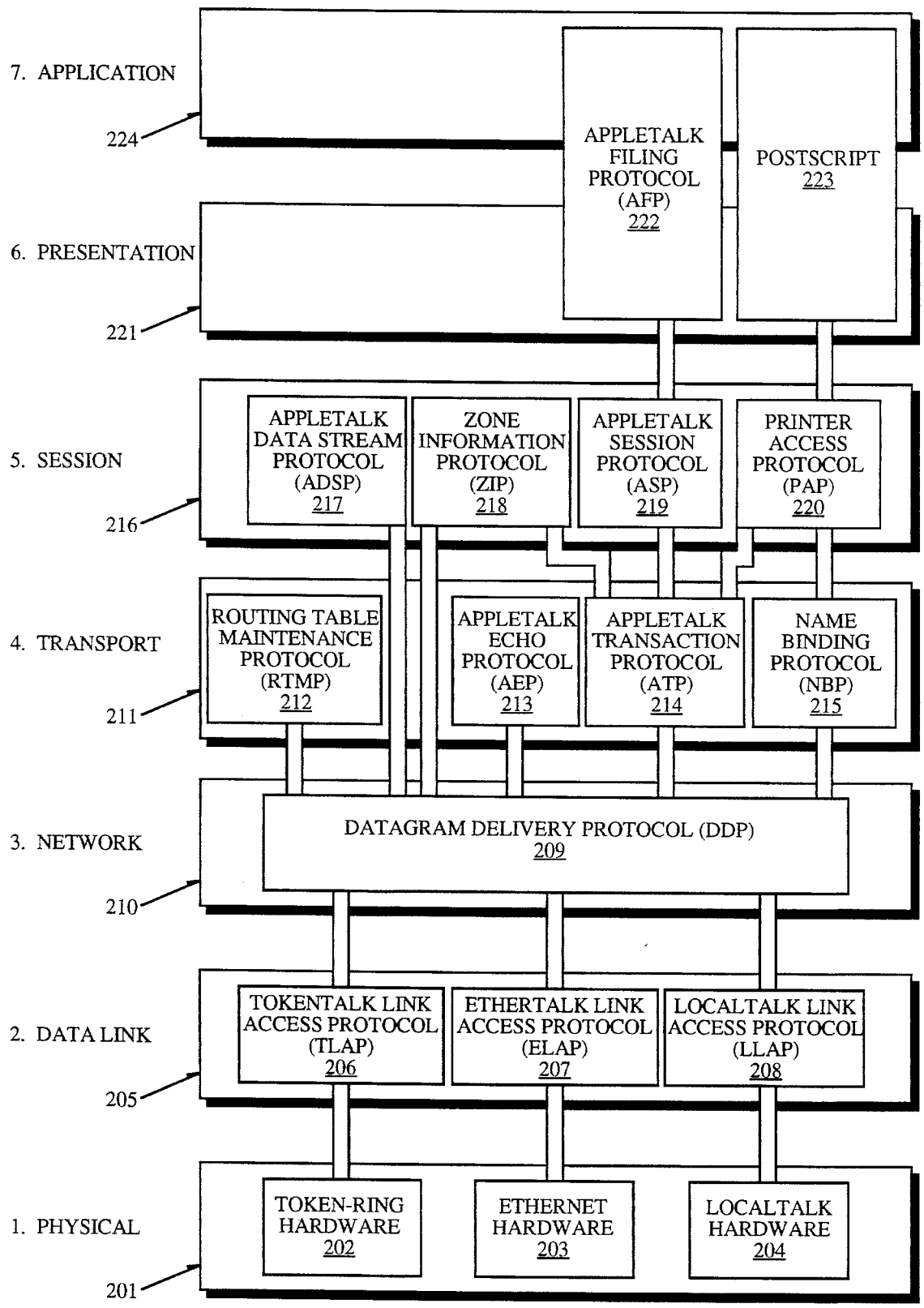
FIG. 2 shows a block diagram of the multiple layer ISO-OSI reference model for networking environments.

FIG. 2 shows a representation of the typical prior art ISO-OSI reference model (Internal Standards Organization which developed and published a standard networking framework known as the Open Systems Interconnection reference model) as applied to the Macintosh®-brand computer system. This model defines in explicit terms the concepts of a protocol and service interface. It defines a protocol architectural framework consisting of seven layers: Physical 201; Data Link 205; Network 210; Transport 211; Session 216; Presentation 221; and Application 224. Each layer may be thought of as a separate process or filter which either encapsulates protocol information onto existing data packets, strips information transmitted in the networking system or routes appropriate data packets through the system depending on the type of packet and the particular layer in which the packet resides. The various layers allow packets to be transmitted from one variety of hardware to another in one process (socket) to another. A detailed discussion of the various features performed by the layers of protocol stack 200 will not be submitted, however, a detailed description of the various functions of the protocol stack may be found in the publication G. Sidhu, R. F. Andrews, and A. B. Oppenheimer, *Inside AppleTalk* (Second Edition, 1990) ("Inside AppleTalk").

Note that the following discussion of the apparatus discussed herein will refer specifically to a series of routines which are compiled, linked, and then run in object code representation in computer system 100 of the preferred embodiment. However, it can be appreciated by one skilled in the art that the foregoing methods and apparatus may be implemented in a special purpose hardware device, such as discrete logic devices, large scale integrated circuits (LSI's), or other specialized hardware. It can be appreciated by one skilled in the art that the description herein has equal application to other apparatus having similar functions.

The preferred embodiment implements a process which operates in the background of a computer system during normal system run time. The modification process of the preferred embodiment is inserted as a run time process which operates in conjunction with the Link Access Protocol (LAP) software used in the Macintosh® brand computer systems. This process is known as the "LAP Manager" and is used for translating packets between Network Layer 210 and Data Link Layer 205, as shown in FIG. 2. Any one of the currently supported link access protocols, such as TokenTalk™ brand link access protocol (TLAP) 206, EtherTalk™ brand link access protocol (ELAP) 207, or LocalTalk™ brand link access protocol (LLAP) 208 may be utilized in this preferred embodiment (trademarks of Apple Computer). Of course, it can be appreciated by one skilled in the art that other link access protocols residing in data link layer 205 may be supported in future versions of the networking system. Each of the packets translated from Data Link Layer 205 is handled by the Datagram Delivery Protocol 209, as shown in FIG. 2. Thus, packets are modified from DDP layer 209 and transmitted to protocols layers 206, 207, or 208, as is shown in FIG. 2 in one embodiment. In another embodiment, packets received from the higher levels 206, 207, and 208 are modified and passed to Data Link layer 205. Thus, in either case, packets being received and/or those transmitted may be intercepted and/or modified.

The packet modification method of the preferred embodiment operates in conjunction with the AppleTalk-brand LAP (link access protocol) manager. The LAP manager is described in detail in the publication *Macintosh® AppleTalk® Connections Programmer's Guide*, Part No. M7056/A (1990) ("Connections Guide"), available from the Apple Programmer and Developer's Association (APDA) of Cupertino, Calif. This allows the network modification methods of the preferred embodiment to be used with any application program interfaces supported by the AppleTalk LAP manager. Any future network links which, then, may be used in conjunction with the packet modification described herein will be supported as long as they are complying with the Application Program's Interface (API) of the LAP Manager.

The packet modification method of the preferred embodiment utilizes the system calls LWrtGet, LWrtRemove, and LWrtInsert described in Connections Guide at pp. 29–48 to insert computer code that provides the interception and modification process of the preferred embodiment into the LAP manager's internally maintained table of pointers for connections which communicate with the hardware devices specified for a given port which resides at physical layer 201, as is shown in FIG. 2. This table of pointers, in the preferred embodiment, is accessed via the "LAPWrite hook." Thus, for a given port, LWrtGet is called in order to determine the location of the original code for controlling the port's hardware link. That address is then inserted into a routine of executable code of the preferred embodiment that has been created in memory for controlling that port by the packet interception and modification process of the preferred embodiment. LWrtRemove removes the reference to the original code which was used for controlling the hardware link. To replace that reference, the preferred embodiment uses LWrtInsert to insert a reference to the process module of the preferred embodiment into the table accessed by the LAPWrite hook of the LAP Manager. Then, whenever a packet is received, the packets are intercepted by the newly inserted packet interception and modification process, and when the process has completed processing the packet, a call is made to the original driver for the port residing at data link layer 205, and the packet is then processed in its normal manner.

Figure 3:
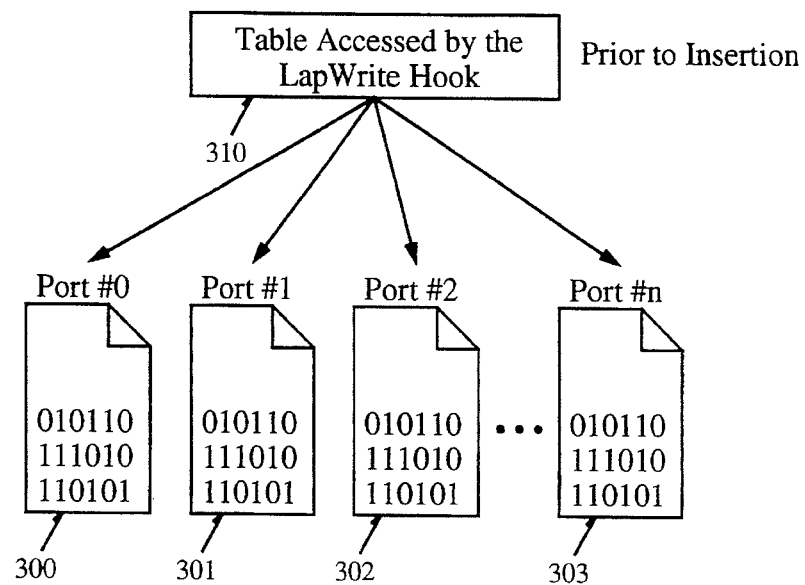
FIG. 3 shows a table of pointers of the Local Access Protocol (LAP) write "hook."
Figure 4:
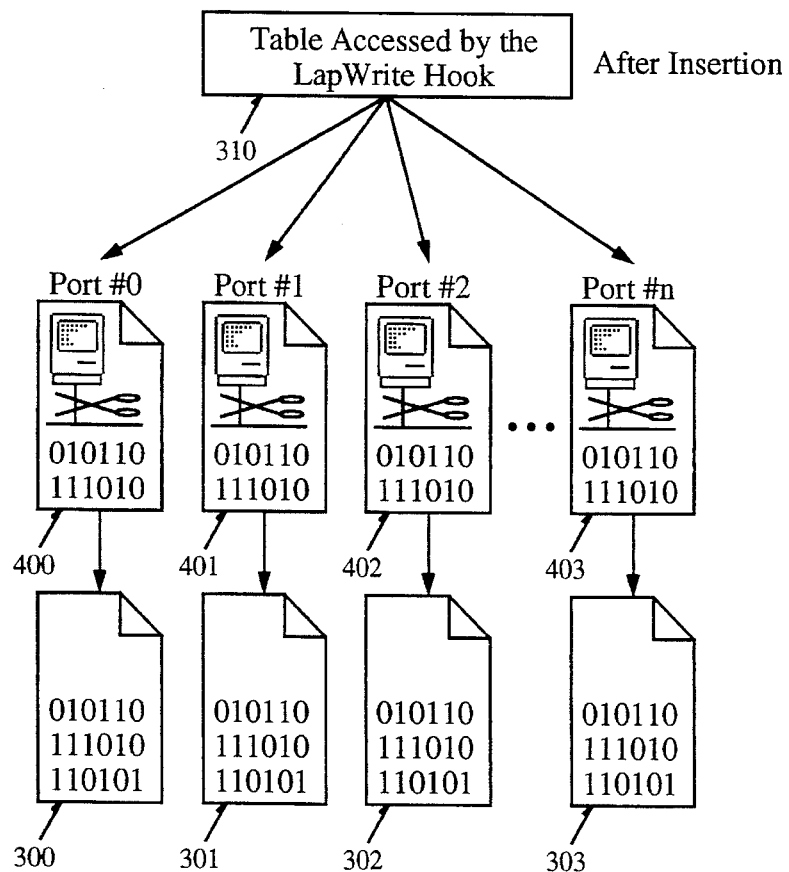
FIG. 4 shows a table of pointers for the LAPWrite hook with the packet modification process inserted.

FIGS. 3 and 4 graphically illustrate the insertion of the packet interception and modification procedure into the table of processes accessed via the LAPWrite hook. FIG. 3 shows table 310 which is associated with each of the processes for the link access protocols. FIG. 3 shows the table prior to the insertion of the packet interception and modification process. As is shown, for each of the ports 0–n, table 310 references each of the port processes 300–303 which handles the data link layer translation for each of the physical ports 0–n which are connected to the system. After insertion of the packet interception and modification process, table 310 references the packet interception/modification procedure using a different pointer for each of the processes 400–403. Thus, once a packet is transmitted to data link layer 205, they are passed to the interception/modification process, as exemplified by graphical images 400–403 representing processes to the interception/modification process. Then, the process references each of the original data link processes 300–303, as is shown in FIG. 4. Thus, in this manner, packets received are intercepted by the packet interception/modification process, modified, if necessary, and then passed to the data link layer routines for further processing and transmission to the hardware devices for the physical links at physical layer 201.

The preferred embodiment allows a user to view conditions upon which packet interception and modification will be performed and, further, view actions which occur upon detection of those conditions. The user enters the information using a variety of input methods discussed later. Moreover, feedback is provided which gives a status of the current packet interception/modification. This is provided in window 500. Window 500 has three distinct portions. 501 is used by the user for viewing those conditions to detect and actions which are to occur upon the meeting of the conditions. This is done in a "scripting" programming language wherein the user may either specify conditions and actions to occur, or wherein other user interface windows may be accessed to assist in specifying these conditions and actions. In the example shown in 501 of FIG. 5, no condition or action has been specified. The screen shown is the default, if condition is "true," then "nothing" is performed (e.g., no interception/modification of packets is performed).

Figure 5:
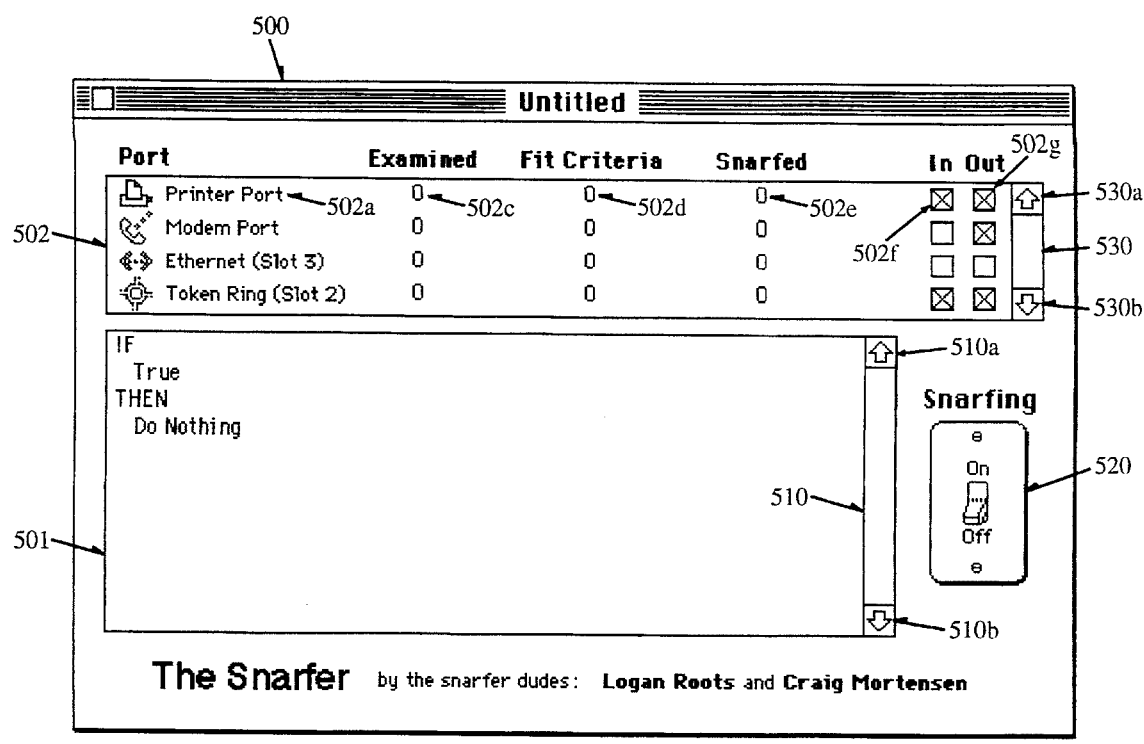
FIG. 5 is a view of a user's window which displays the conditions and actions to be performed on packets, the list of ports, and statistics pertaining to the ports.

A second portion of window 500 in FIG. 5 is shown as 502. 502 is used by the network interception/modification process for providing feedback to the user of all ports that are present in the computer upon which the process is activated. In the example shown in window 500 of FIG. 5, several ports, their locations (slots), and icons representing the ports are displayed (e.g., an Ethernet card is present in Slot 3 and a Token Ring card is present in Slot 2). Window 502 also contains several fields which display the current statistics of the interception/modification process for each port. For example, field 502a identifies the port for which data is being modified. In the case shown in 502 of FIG. 5, this is the built-in "Printer" port, as indicated by field 502a. Fields 502c–502e indicate the number of packets examined, those which have met the criteria, and those on which actions have been performed. Because the process has not been activated, as is reflected by toggle 520 being in a "off" state, no packets have been examined and all statistics are, therefore, zero. 502d indicates all packets which have fit the criteria (conditions) specified in window 501. Again, because the process is currently not activated, no packets have yet fit the criteria. 502e indicates all those packets which have fit the criteria and which have, further, been modified. The interception and modification of packets is known in this embodiment as a "snarf," and the field indicates all packets which have been "snarfed." Again, because the process is not activated, 502e indicates that zero packets have been "snarfed." Finally, 502f is a toggle box selected by a user for activating whether the interception and modification process will be performed upon incoming data from the identified port (e.g., "up" the protocol stack from Link layer 205 to Network layer 210). As is shown in 502f, the check box toggle has been selected, and thus, it is desired by the user that the interception and modification be performed upon incoming packets received from the printer port. Also, outgoing packets from the node upon which the process is active may be modified by the user when he specifies check box 502g. Thus, packets traversing from Network layer 210 to Link layer 205 will be intercepted and, if the criteria is matched, modified.

If the number of ports exceeds that which would be able to be displayed in window 502, then, scroll bar 530 may be selected by the user to scroll to display other ports which are in the system. The scroll bar comprises two additional arrows for scrolling up and down, 530a and 530b, respectively. This is also true for list box 501 which allows a user to specify more conditions and actions than can fit in one single display window 501. Therefore, the user may use the scroll bar 510 which comprises up arrow 510a and down arrow 510b for scrolling up and down the conditions and actions in the displayed region 501. Lastly, as discussed previously, window 500 comprises an "enable" toggle 520 which has two states. When 520 is in the state shown in window 500, no interception and modification of the packets for all ports is taking place. In other words, all packets are passed unchanged. When 520 is selected, then the state will change to the "on" state, and the process will be activated, checking for conditions specified in 501 and performing the associated actions.

Figure 6:
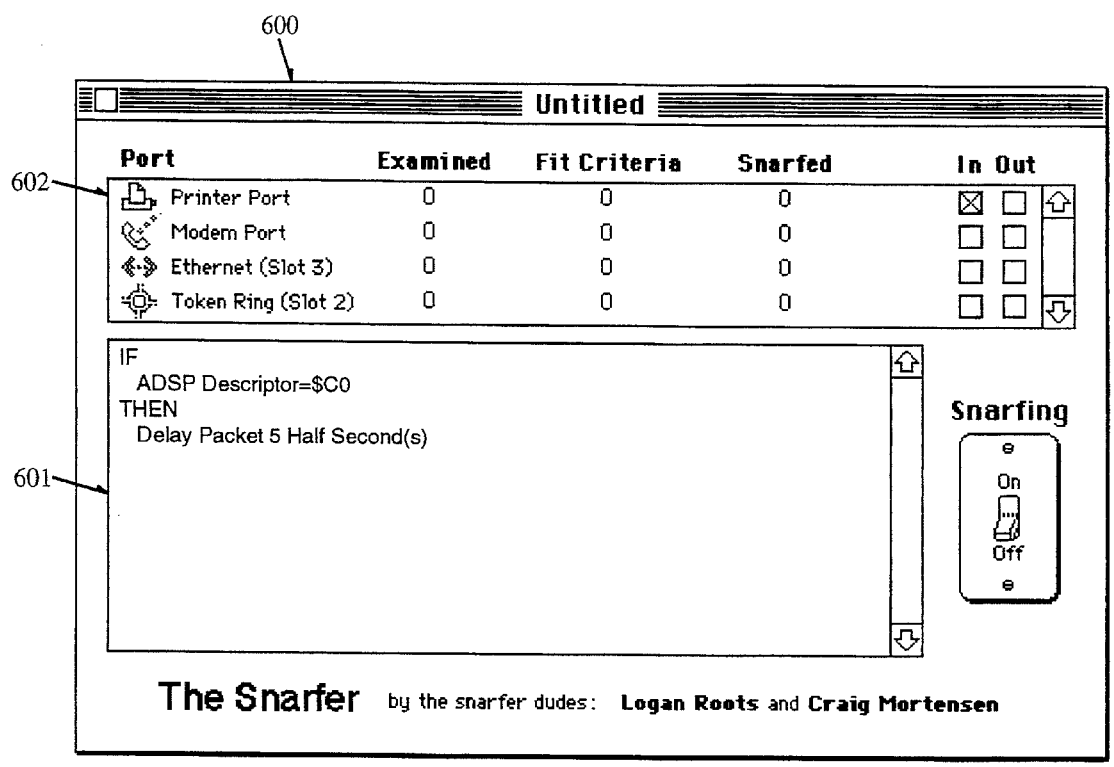
FIG. 6 shows an example window displaying a status of the packet interception/modification.

FIG. 6 shows an example window 600 which has the criteria containing a simple condition and a simple action to be performed upon packets. As discussed previously with respect to window 500 of FIG. 5, the "Printer" port is the current port being affected, as is indicated by window 602 in FIG. 6. 601 contains simple criteria which describes a single condition and an associated action. In this case, the condition is "If ADSP Descriptor=$C0," then the action "Delay Packet 5 Half Second(s)" is performed when the process is activated. This is shown in 601 of FIG. 6. In other words, this particular script will delay a packet 5 half second(s) (the time unit of measure specified by the user in this example, see below) if the portion of the packet containing the session layer Apple data stream protocol (ADSP), descriptor=$C0, as specified at AppleTalk Data Stream Protocol 217 shown in FIG. 2.

An additional related user interface screen to that shown in FIGS. 5 and 6 will now be described. Most of the user interface windows which will be discussed are available through pull-down menu items on the main display or by selecting regions such as 601 in FIG. 6. Thus, instead of typing in the text contained in window 501 or 601 shown in FIG. 5 and 6, the user may insert such text upon a user selecting various options and various subwindows associated with the main windows 500 or 600, for example, as is shown in FIGS. 5 and 6.

Figure 7:
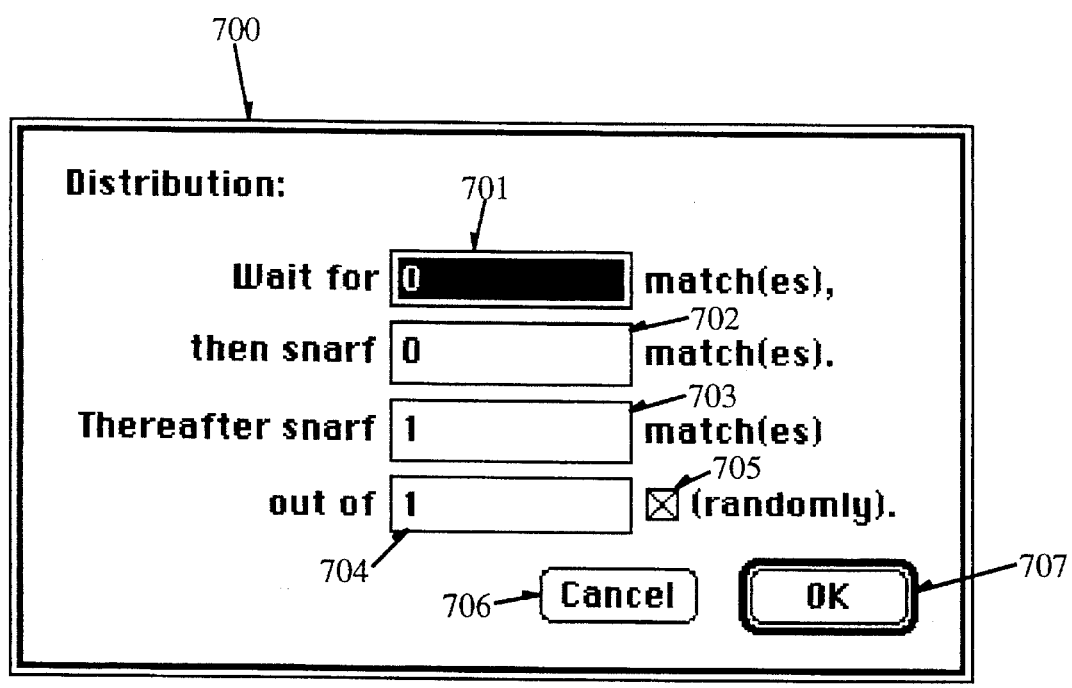
FIG. 7 shows a distribution window which allows a user to specify an initial behavior when packets are intercepted and modified.

One subwindow available from the main user interface screen is the "distribution" window 700 available under a "commands" option on the user interface display. "Distribution" dialog window 700 shown in FIG. 7 is used for specifying the initial interception(s) which should occur for the particular port. In other words, this allows a user to specify which of certain initial packets meeting certain criteria are then to be intercepted and, then, subsequent packets to the initial packet which should be intercepted and modified. The first two fields 701 and 702 are read as a single sentence, and the next three fields 703, 704, and 705 are also read as a single sentence. In window 700 shown in FIG. 7, the initial condition is "Wait for zero match(es), then snarf zero match(es)." This is the default condition where packet interception (and/or modification) begins immediately on all packets. Thereafter, after initial packets have been received, one packet out of every one (1/1 or 100%) of matches is intercepted randomly according to the selection of toggle 705, in fields 703 and 704. In other words, 701 allows the user to specify how many packets must be received prior to interception and modification being performed, as shown in field 702. Thereafter, all (100%) of the packets matching the criteria are intercepted and modified randomly, as specified in fields 703, 704, and 705. Once the user is satisfied with his entries into fields 701–705, the user may select either "CANCEL" selection 706 or "OK" selection 707 to initiate the distribution specified in window 700. It should be noted that "random" selection toggle 705, when selected, initiates a pseudo-random process in the interception/modification process. This process randomly selects those packets which will be intercepted, such as specified in window 700 of FIG. 7. This may be done for any number of packets which are specified to be intercepted and modified, in other words, a fraction such as one out of one, which is currently specified in fields 703 and 704. This allows the simulation of intermittent transmission errors for testing purposes, for example.

Figure 8A:
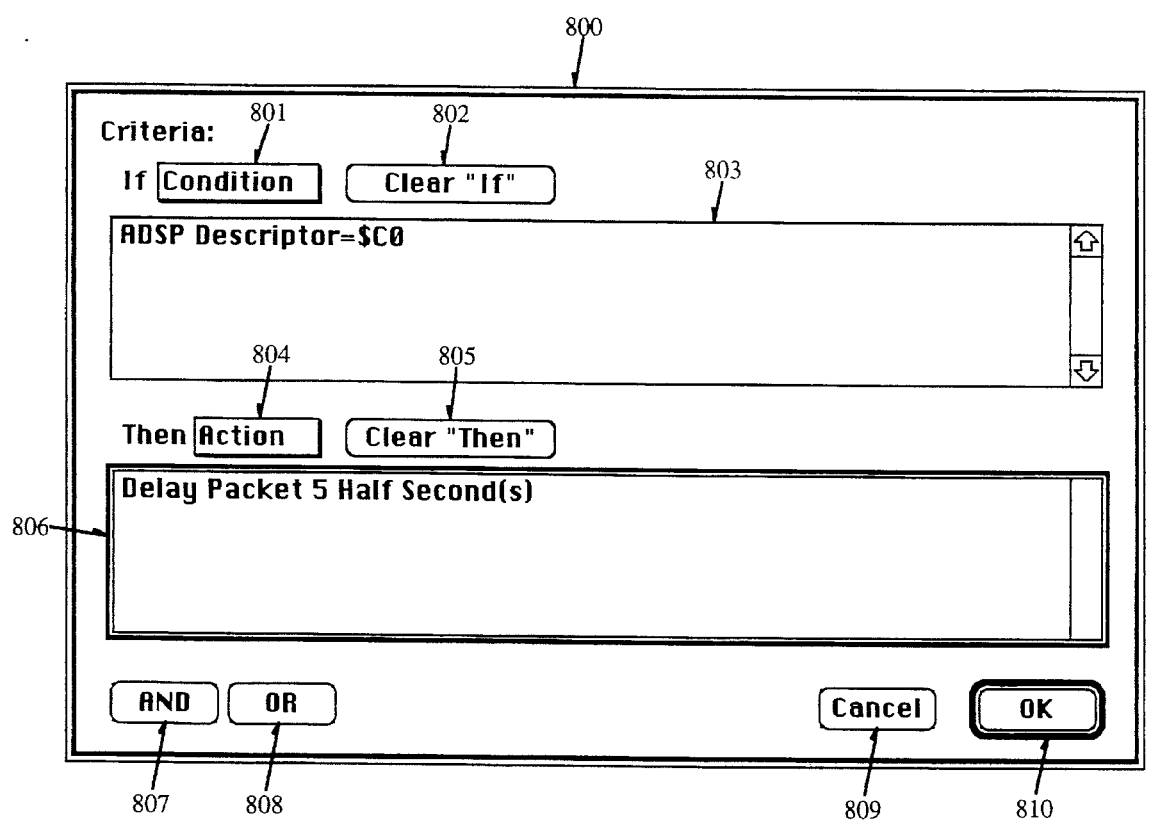
FIG. 8a shows a criteria window which is used for specifying conditions and actions to be perforated.

The conditions and actions, such as shown in list box 601 of FIG. 6, may be specified by using a menu command to activate window 800 in FIG. 8a. As is shown in 800 of FIG. 8a, information has already been inserted by a user, and it can be appreciated by one skilled in the art that these fields are filled in using typical selection and input techniques in GUI environments such as the Macintosh® personal computer.

List box 803 is used for specifying the condition(s) upon which the action(s) in list box 806 will be performed. The information contained within 803 may be modified by selecting an appropriate condition item from condition pop-up menu 801 or may be cleared by the user selecting clear button 802, shown in 800 of FIG. 8. This represents a "condition" that was specified by using the pop-up menu 801, which is shown in FIG. 8a. The options available under pop-up menu 801 will be discussed in more detail with reference to FIG. 8b. Any number of conditions (up to a maximum of 20 in the preferred embodiment) may be entered in list box 803, each condition separated by a conjunction or disjunction Boolean operation ("and" or "or") by the user selecting either "AND" button 807 or "OR" button 808. In the preferred embodiment, conditions are sequentially evaluated by the process interpreter and do not follow nominal evaluation rules for Boolean expressions. However, it can be appreciated by one skilled in the art that a more complex scheme of condition evaluation may be performed using Boolean operations and separators (e.g., parenthesis) to indicate order of evaluation of the expression shown in list box 803. Conditions may be separated by "AND" or "OR" conjunctions (known as "conjuncts" in the preferred embodiment), however, actions may only be separated by an "AND" to prevent alternative actions from being specified. Thus, when specifying actions in list box 806, the user cannot select button 808. The button is "ghosted out" or dimmed on the user interface display to show that it is not available for selection.

The "action" list box 806 specifies which actions are to be performed upon the packets matching the criteria shown in list box 803. The information contained in list box 806 is an "action," specified by using the pop-up menu 804 in FIG. 8a. The action items may be cleared when the user by selects selection "button" 805. As just discussed, a series of expressions may be input into window 806, separated by conjunctions and by the user selecting button 807. 808, however, is not available for selection by the user because it would allow alternative actions to be performed by the process. Thus, selection 808 is not available during modification of action list box 806.

As is common in other windows shown in this application and other areas of the Macintosh® user interface, selection buttons 809 and 810) are used for "canceling" the information shown in window 800 (not allowing the changes to take effect) or allowing the changes specified in 800 to take effect by selecting "OK" button 810. Once 810 has been selected, the information specified in the condition and list boxes 803 and 806, respectively, are displayed in a window, such as 501 or 601 of FIGS. 5 and 6 and entered into the action and condition queues of the process used by the preferred embodiment (see below). Thus, the user may view the currently activated conditions and actions to be performed upon detection of the conditions. The user is, further, provided feedback information in windows 502 and 602 of FIGS. 5 and 6 for packets which have been intercepted (those that have met the condition) and those packets which have been modified or "snarfed" (those upon which the action has been performed). Various parameters and other actions or conditions which may be performed will now be discussed.

Figure 8B:
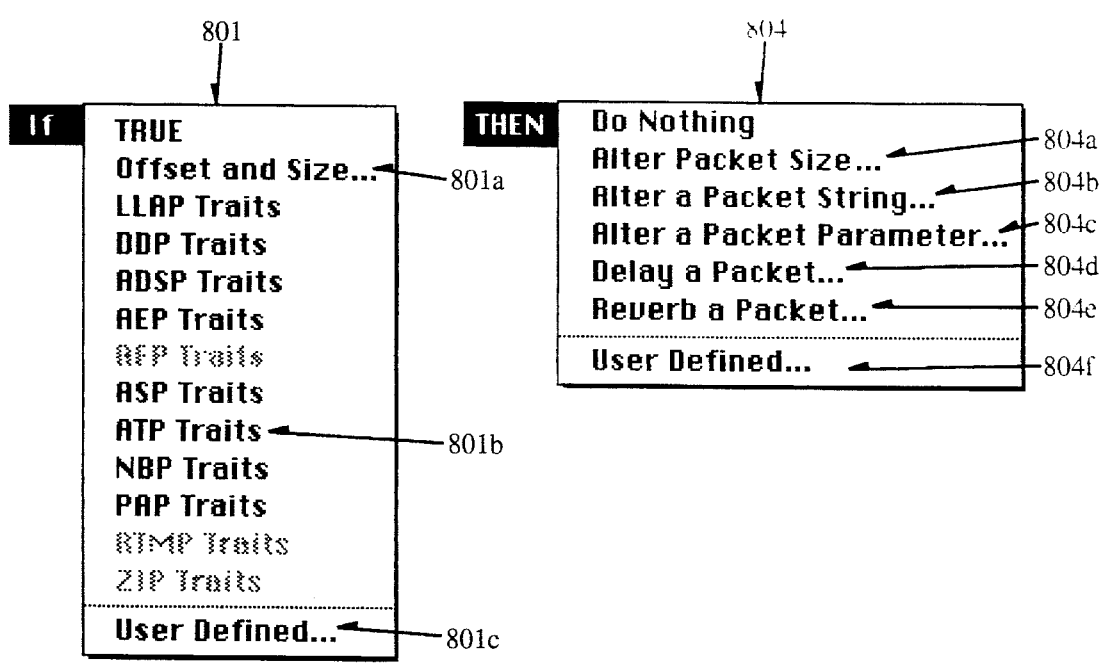
FIG. 8b shows options available under pop-up menu items for those conditions and actions.

A more detailed view of the options available under pop-up menu item 801 and 804 of FIG. 8a is described with reference to FIG. 8b. For example, 801 of FIG. 8a may contain the following items listed in 801 of FIG. 8b. These include many of the various packet traits available at various levels of the protocol stack shown in FIG. 2. Each of the items, when selected by the user during specification of condition actions as is specified in 801 of FIG. 8b, causes a second series of windows to be displayed wherein the user may specify given portions of the packets to be checked to meet the conditions specified by the user. The various traits specified in 801 of FIG. 8b are shown for illustration purposes only, and no way limit the scope of the present invention. It can be appreciated by one skilled in the art that, as other protocols are defined within a protocol stack such as 200 shown in FIG. 2, other traits may be determined. In addition, the preferred embodiment provides a means for specifying user-specified conditions using option 801b, which can be handled by user-specified actions, to allow other conditions to be determined to activate packet modification.

804 of FIG. 8b shows various options which may be available under the action pop-up menu item 804 shown in FIG. 8a. For example, nothing may be done to the packets, packet sizes may be altered, packet strings may be altered, etc. Again, like the condition specified above, the selection of each of items shown in 804 causes a separate window to be activated which allows the user to specify the various options for the type of modification desired. Each of these particular modifications will be discussed in more detail below, however, as can be appreciated by one skilled in the art that other modifications may be performed upon packets using a similar pop-up menu item as 804 in FIG. 8b. User-specified actions are also available by selecting option 804f.

Figure 9A:
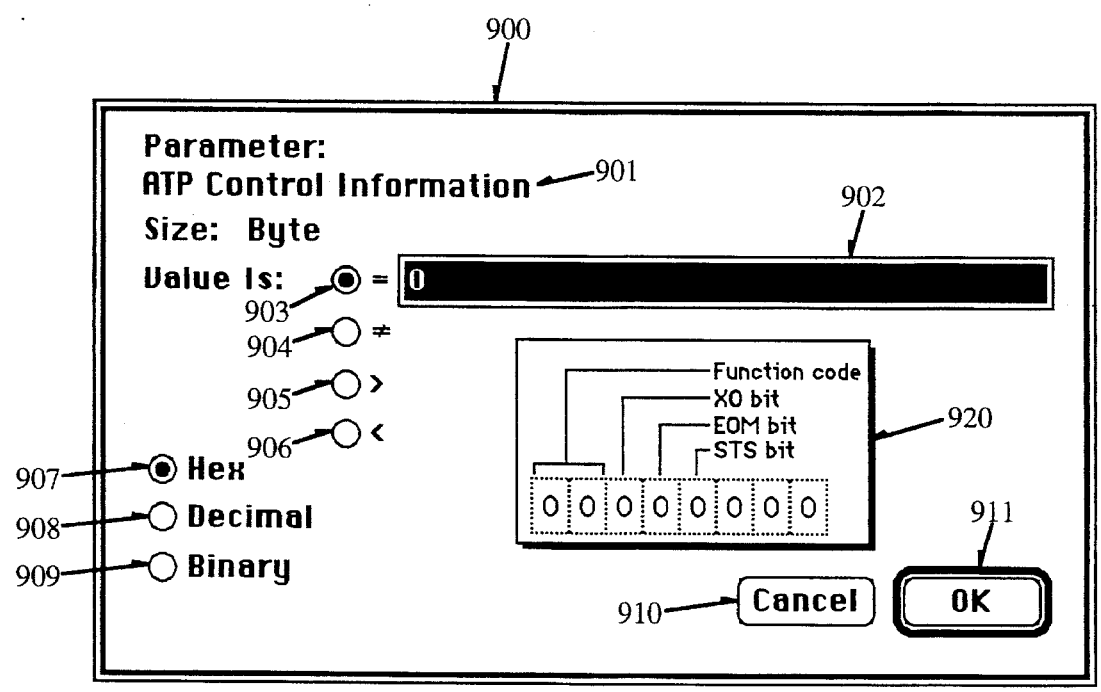
FIGS. 9a and 9b show parameter windows for specifying condition and action parameters for packet modification.

Each condition may be specified by using a window such as 900 shown in FIG. 9a. 900 in FIG. 9a is displayed when the user selects the "condition" pop-up menu item 801b, for example, of FIG. 8b. This allows various control or other types of information in the incoming packets to be modified using specific parameters defined in AppleTalk. One example of this is the "ATP Control Information," which is shown as 901 in window 900 of FIG. 9. Other examples of such parameters include control or protocol-specific information contained in the various levels of the protocol stack shown in FIG. 2, such as the AppleTalk Transaction Protocol Information (ATP) 214 or AppleTalk Data Stream Protocol (ADSP) 217 of the protocol stack. The other levels of the protocol stack may be used as parameters by selecting the condition pop-up menu 801 in FIG. 8a. The criteria shown in parameter window 900 is whether the "ATP Control Information" equals zero. The value that the user wishes to perform the test upon is input by the user is entered into field 902 and various arithmetic operators which may be selected by selecting one of the radio buttons 903, 904, 905, or 906. In addition, the user may specify that the value entered into 902 is represented in one of three different formats: Hexadecimal, decimal, or binary. One of these three formats are selected by selecting one of the radio buttons 907, 908, or 909. The definitions of the parameter being tested for is given to the user in field 920 of window 900, which indicates which particular bits of the packet information specified in 901. This small picture appears only for special AppleTalk brand protocol parameters. This provides a convenient reference for the user of the various definitions of the information being entered into field 902. It, thus, makes referring to manuals unnecessary and makes the input process for conditions much easier for the user. The user may also specify values in field 902 by selecting individual bits in the packet bit definition specified in 920 (e.g. the "Function Code"), and display 902 changes accordingly. Each of the bits in field 920 has three states depending on the number of times the bit position is selected by a user using the selection device: "1"; "0"; or "X." "1" and "0" require that the bit have that value. X is a "don't care" setting which causes the process to ignore the selected bit value. Lastly, as discussed with reference to some of the other windows in this user interface, "CANCEL" and "OK" buttons 910 and 911 allow the changes in the items of window 900 to take effect or be canceled, depending on which button is selected by the user. If the information is updated and "OK" button 911 is selected, then a suitable expression for the parameter is entered into the list box 803 of FIG. 8a, and a queue element is created having the appropriate information.

Figure 9B:
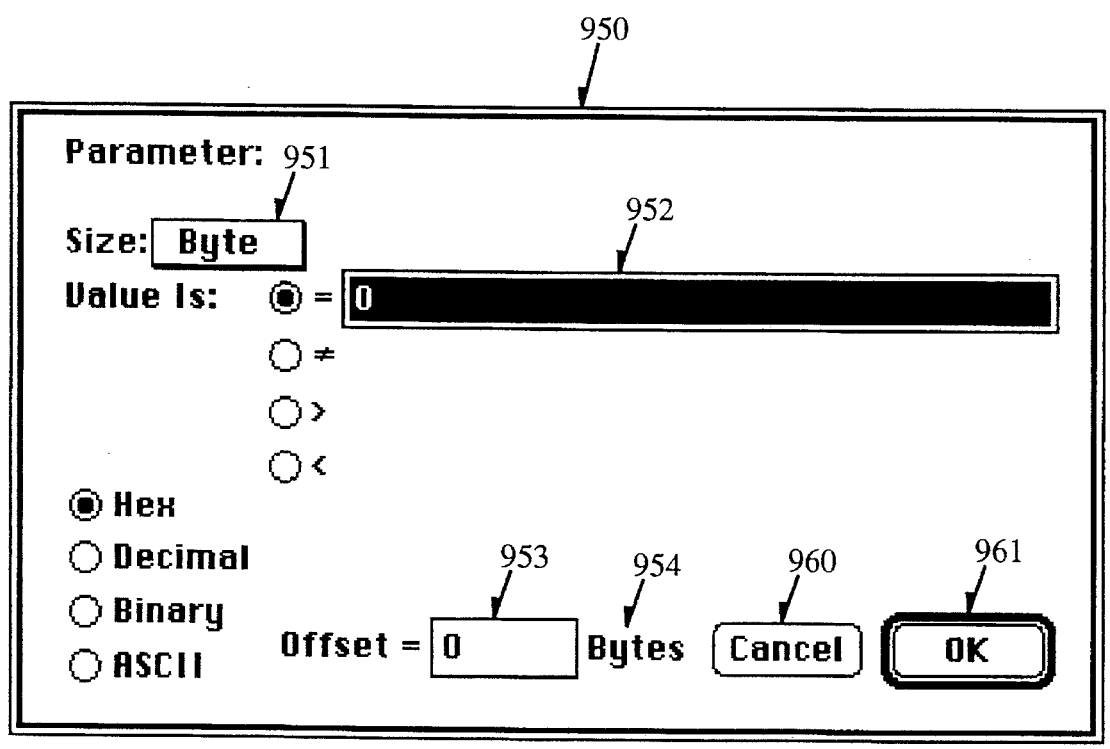

Another window for specifying parameters are shown as 950 in FIG. 9b. This is used when the user wishes to modify an item in a packet by specifying an offset from the beginning of the packet. This may be accessed from menu item 801a of FIG. 8b. This item allows the specification of the packet parameter without reference to the portions of the packet defined under AppleTalk as in FIG. 9a. The size of the item to use as the parameter is specified using pop-up menu 951 in window 950. The value is specified in field 952, and the offset from the beginning of the packet is specified in field 953. 954 provides feedback for the offset size selected using pop-up 951. "Cancel" and "OK" buttons 960 and 961 are used in the typical manner. Other items in window 950 operate in the manner as described with reference to 900 of FIG. 9a.

Figure 10:
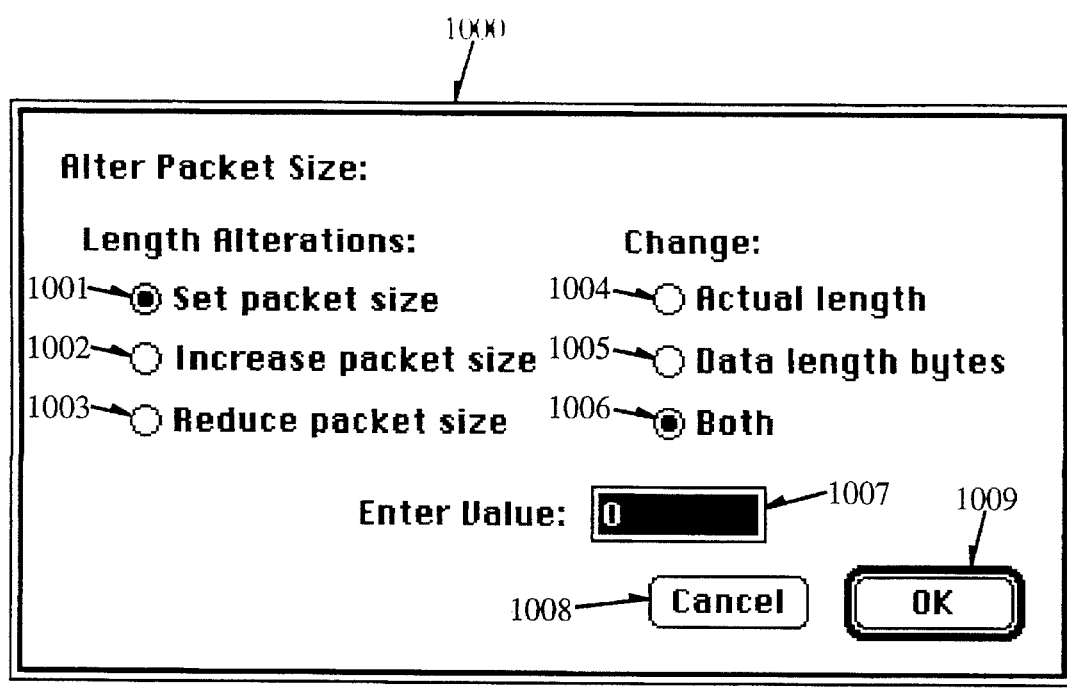
FIG. 10 shows a window for altering a packer's size.

The specification of action elements contained within a list box such as 806 of FIG. 8a will now be discussed. One action which may be performed is altering a packer's size. Certain errors which may occur in a networking system may cause a packet size to be increased or decreased. This option may be available as an "action" under option 804a of FIG. 8b. The user may specifying the alter packet size by inputting various information into a window such as 1000 of FIG. 10. A packet size may be set to a fixed value (truncated), increased by a fixed value (null characters appended), or reduced by a fixed value to simulate various error conditions. The change in size may be indicated in actual physical length of the packet, data length (datagram length in AppleTalk's DDP header datagram delivery protocol), or both. Setting the packet size to zero will prevent the packet from being forwarded. 1000 in FIG. 10 shows the default settings when the window appears, however, these may be modified by the user within this window. Setting the packet size using button 1001 will allow the packet to be truncated or expanded until it reaches a fixed packet size. 1002 and 1003 am used for increasing or reducing the packet size, :respectively, which will, then, expand by the addition of null characters to the packet or reduce by truncation. Further, a value to which the packet will be reduced, increased, or set is specified in field 1007. Radio dialog buttons 1004, 1005, and 1006 are used to specify the representation of the value input into field 1007. Therefore, if 1004 is selected, then the actual physical length of the packet is changed. The user can also use 1005 to specify that the datagram length field of the DDP is affected. 1006 is the default used for affecting 1004 and 1005. As always, a selection of 1008 will cause the alteration of the packet size to be aborted, and 1009 will cause the changes in window 1000 to take effect. Then, the process creates an "action" queue element.

Figure 11:
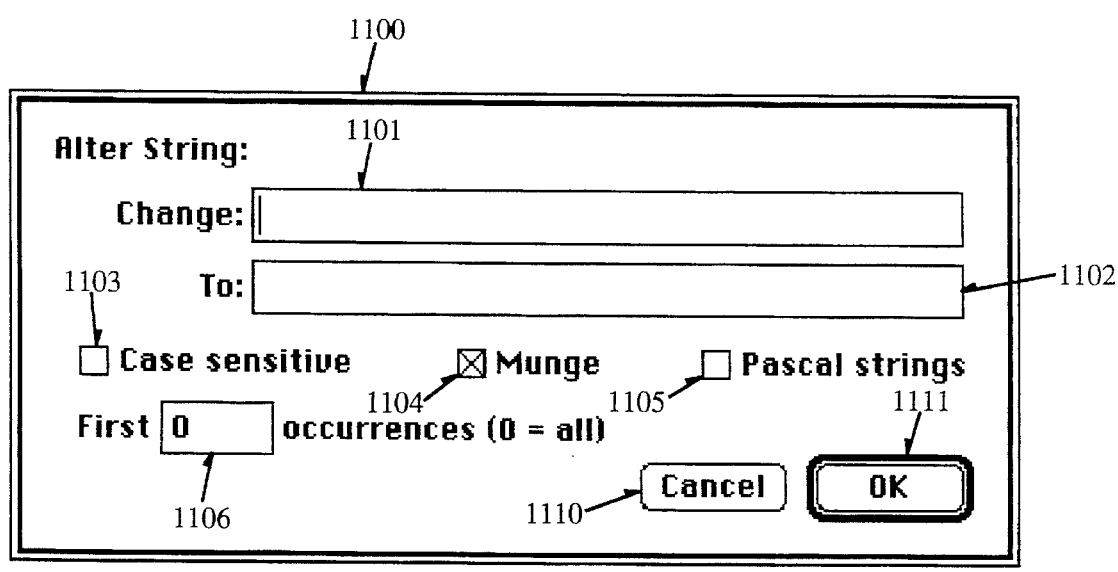
FIG. 11 shows a window for altering a string in packets.

Another action which may be performed on a packet is altering a string contained in the packet. This is usually performed in the data area of the packet being examined. Data typically has a maximum value of 32 characters, however, it can be appreciated by one skilled in the art that other lengths of strings may be handled. The preferred embodiment, however, has a current limit of 32 characters. Alter string window 1100 shown in FIG. 11 allows certain manipulations of character strings to be performed. It is accessible by selecting item 804b in FIG. 8b. In other words, for given character strings input into field 1101, the strings will be changed to the replacement string shown in field 1102 of FIG. 11. The user may also specify that these strings be case-sensitive, that is, have the exact case (upper/lower or both) as specified in fields 1101 and 1102. This is done by a user selecting the case-sensitive check box 1103. The default setting is "no case sensitivity," so the box is shown unchecked in FIG. 11. "Munge" selection option 1104 may be selected by a user if the user desires to "munge" the string. Munge is a function described in the publication *Inside Macintosh*, Volume 1 (1985), at pp. I-468 through I-470 ("Inside Macintosh"). This function allows substrings within a character string to be replaced. For instance, in the example given in Inside Macintosh, the string "the" may be replaced with the string "an." In other words, "munge" may alter the length of the string, depending on the two strings input into fields 1101 and 1102. 1105 allows the user to specify that the strings are "pascal" strings, that is, that the length is encoded in the first byte of the string. This is not the default setting, so it is shown unchecked in FIG. 11. Also, the user may specify how many occurrences of the string should be altered. This is specified in field 1106. 1106, if it contains a zero, causes all the strings detected, as specified in window 1100, to be modified in the manner specified. As always, the changes input into window 1100 may be aborted or caused to take effect by selecting one of buttons 1110 or 1111 shown in FIG. 11.

Figure 12:
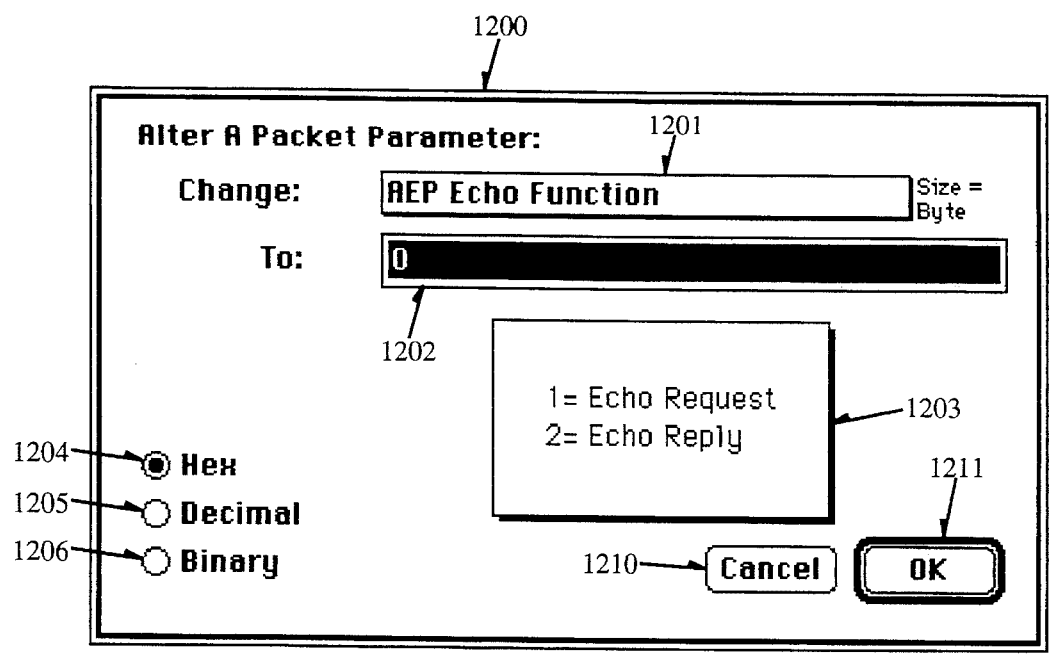
FIG. 12 shows a window for altering a packet parameter.

1200 of FIG. 12 is a user interface window used for altering packet parameters which is accessible under option 804c of FIG. 8b. For example, one of these is shown in field 1201 in FIG. 12. This is similar to specifying an initial condition element, wherein parameters within the various protocols may be modified. The modifiable packet parameters are available by selecting one of the displayed protocol parameters in pop-up menu 1201. Thus, a user specifies a parameter in pop-up menu 1201, and the value will be changed to the value in 1202. 1203 provides pictorial definitions of certain packet parameters which may be placed into field 1202. Again, no reference to manuals or other references is required by the user. Further, the value may be specified in hexadecimal, decimal, or binary by selecting one of radio buttons 1204, 1205, or 1206. As always, the user interface window may be aborted from by selecting "cancel" button 1210, or the changes may be accepted by selecting "OK" button 1211, and an appropriate queue element is created.

Figure 13:
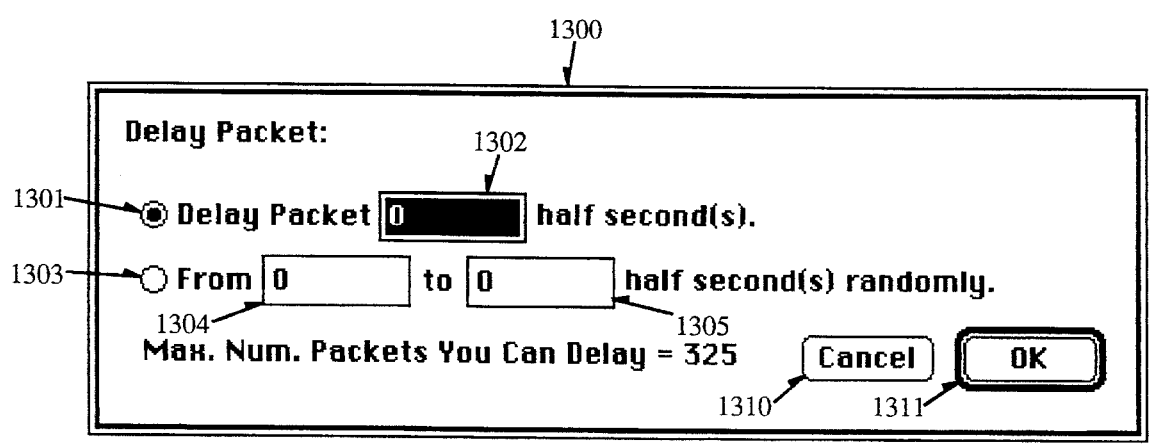
FIG. 13 shows a delay window which may allow a user to specify when and how long packets are delayed in the network.

Another action which may be performed by selecting pop-up menu item 804d is the "delay" packet action. This may be specified using window 1300 of FIG. 13. Timing delays in a system may occur due to various errors, heavy traffic on the network, or other operating conditions. The unit of measure for timing is user-specified. In the example shown in FIG. 13 and the system default, the unit is half seconds. This may be determined by utilizing the timing reference within the computer system to determine when the packet should be transmitted (or retransmitted). The delays applied to packets matching the criteria specified in window 803 of FIG. 8a may be either delayed a certain fixed length or delayed a random length of time. By selecting radio button 1301, the user specifies a certain fixed number of "half seconds" to delay the packet in field 1302. If the user selects radio button 1303, then he can specify a "range" of half seconds in which to "randomly" delay the packet. The minimum random delay which should be applied to the packet is specified in 1304, and the maximum number of half seconds to delay is specified in field 1305. One of the delays within the range specified by 1304 and 1305 is selected randomly using a random number generator which is well-known to those skilled in the art. The maximum number of packets the computer can delay is specified at the bottom of window 1300. This example shows 325 packets, which is specified by the computer according to how much free memory is available. If a user attempts to delay more than 325 packets, in this instance, then an error condition is indicated, and the value is left unchanged (e.g., zero). Changes into the delay packet window are accepted by selecting 1311, and an action queue element is created, otherwise a queue element is not created by selecting 1310.

Figure 14:
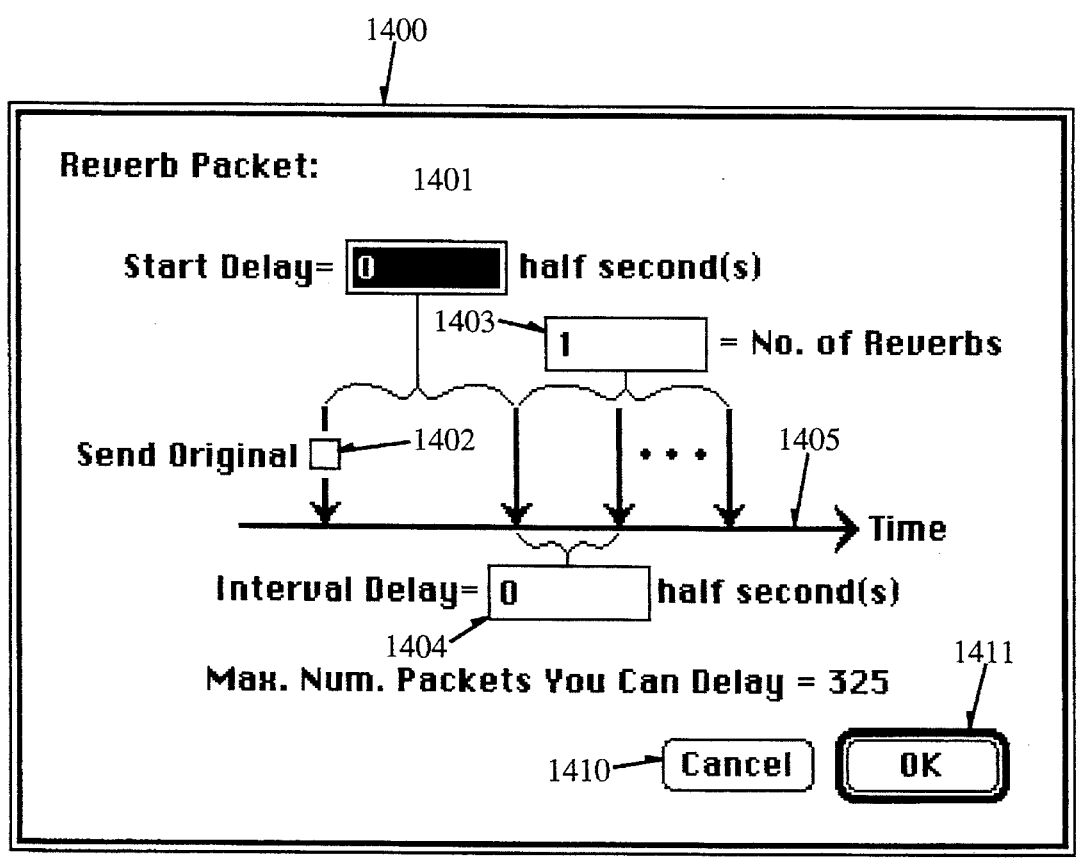
FIG. 14 shows a window which allows a user to specify delays and multiple transmissions (reverb) of a packet in the network.

For "reverbing" a packet (repeating the transmission of the packet several times) to simulate other types of errors in the system, window 1400 is used for specifying those packets which shall be reverbed on the network which is accessed by option 804e of pop-up menu 804. Like 1300 in FIG. 13, the user's specified unit of time measure is the half second, in this instance. Reverb window 1400 allows a user to specify whether the original packet is sent originally or whether that packet will be delayed by a certain specified time period. Further, the number of reverbs (or copies of the packet to repeatedly send) is specified, and the time interval between each of these copies is also allowed to be specified by the user. For example, referring to FIG. 14, 1401 allows the user to specify, in half seconds, the initial delay $t_i$ between the original packet and the first reverb of the packet. The user may also specify by selecting toggle check box 1402, whether the original packet is sent right away. Moreover, 1403 allows the user to specify a number of reverbs or echoes to be transmitted on the network. Also, the user may specify the interval delay t between each of the transmissions of the reverbs by inputting a value into field 1404. Like the delay packet feature, the maximum number of packets which can be delayed, in this example, is shown as 325 (but will vary as system memory usage varies). Also, as is evident from viewing FIG. 14, time line 1405 is displayed which gives a graphical representation of the various time intervals between packet transmissions. As always, to accept the changes input into window 1400 of FIG. 3, the user may select "CANCEL" selection button 1410 to abort changes or "OK" button 1411 to accept the changes and create the queue element. The corresponding script is also updated in window 806 of FIG. 8a.

Figure 15:
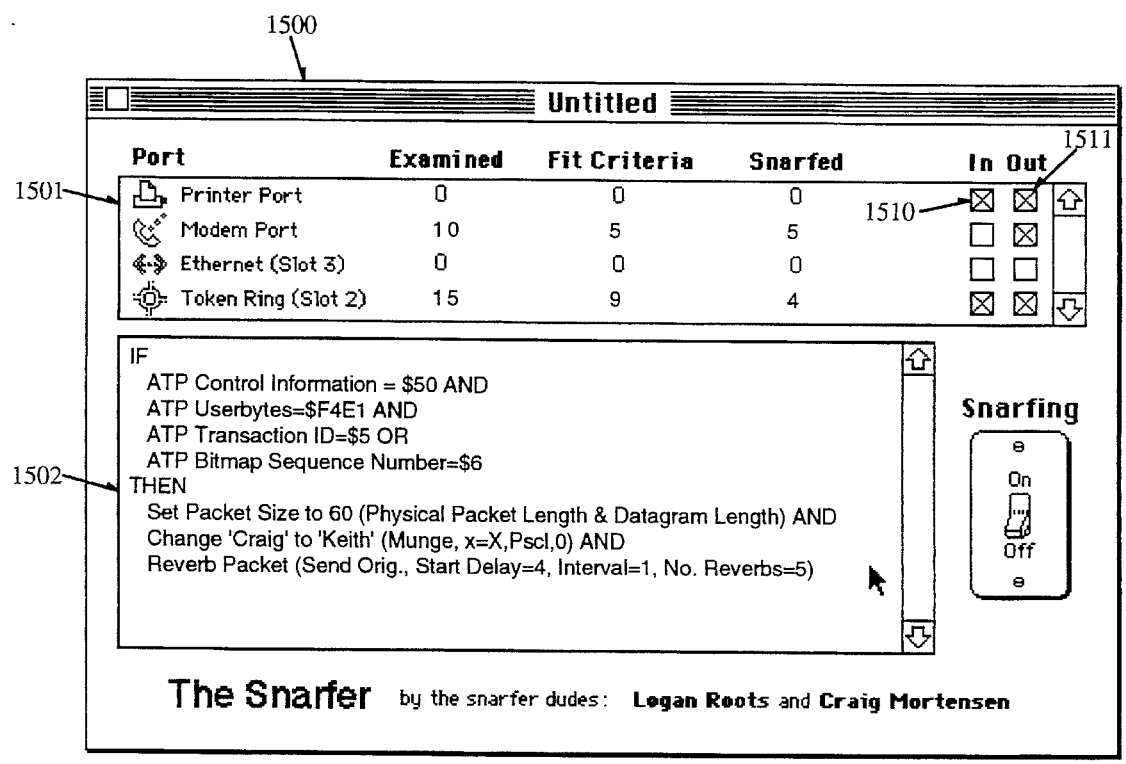
FIG. 15 shows a complete user's window which has some example conditions and actions.

FIG. 15 shows a complex series of conditions and actions which have been specified into field 1502 of window 1500. In this particular example, the node running the interception/modification software pertains to a single Ethernet card (Slot 3), one Token Ring card (Slot 2), and the built-in LocalTalk connector. In the situation shown in 1500, the Printer port has been deactivated as indicated by its check boxes 1510 and 1511 being shown unchecked. The other ports have their statistics displayed in window 1500 since the last interception and modification was activated or since the statistics have been cleared. The criteria involved ATP packets with their control information, user bytes, transaction ID, and bitmap sequence number. When these packets were intercepted, they were truncated to 60 bytes in length (this value is also reflected in the datagram length of the DDP header). If the packet had any data in it that matched the string "Craig," it is changed to "Keith" and, further, is indicated as a pascal string. Finally, the packet is reverbed by sending the original packet, waiting four half seconds, and sending five extra copies of the packet on the network with a time interval of one half second between each reverb. This is all clearly apparent by viewing 1502.

1600 of FIG. 6 is a flow diagram illustrating steps which are taken during execution of the interception/modification process. The entry point is shown as 1601 and simultaneous with the start of the main body of the process, a concurrent process illustrated as steps 1603–1609 is executed which receives packets from other modules in the interception/modification process and queues them up for delay within the system. This is illustrated as step 1603. The system time manager task scans the delay queue for packets to determine appropriate intervals in which packets will be transmitted to the higher or lower layers in the ISO-OSI model. At step 1605, such incoming packets are received for queuing. Then, simultaneous with the remaining steps in 1600 which are executed concurrently, substeps 1607 and 1609 determine whether it is the time to send delayed packets contained in the packet delay queue, and, if so, the packet is transmitted to the higher or lower levels in the ISO-OSI model for simulation of reception or transmission delays at step 1609.

Then, step 1609 leads back to step 1605 for additional queuing of delayed packets. 1605–1609 execute continuously while the interception/modification process is active.

Figure 16A:
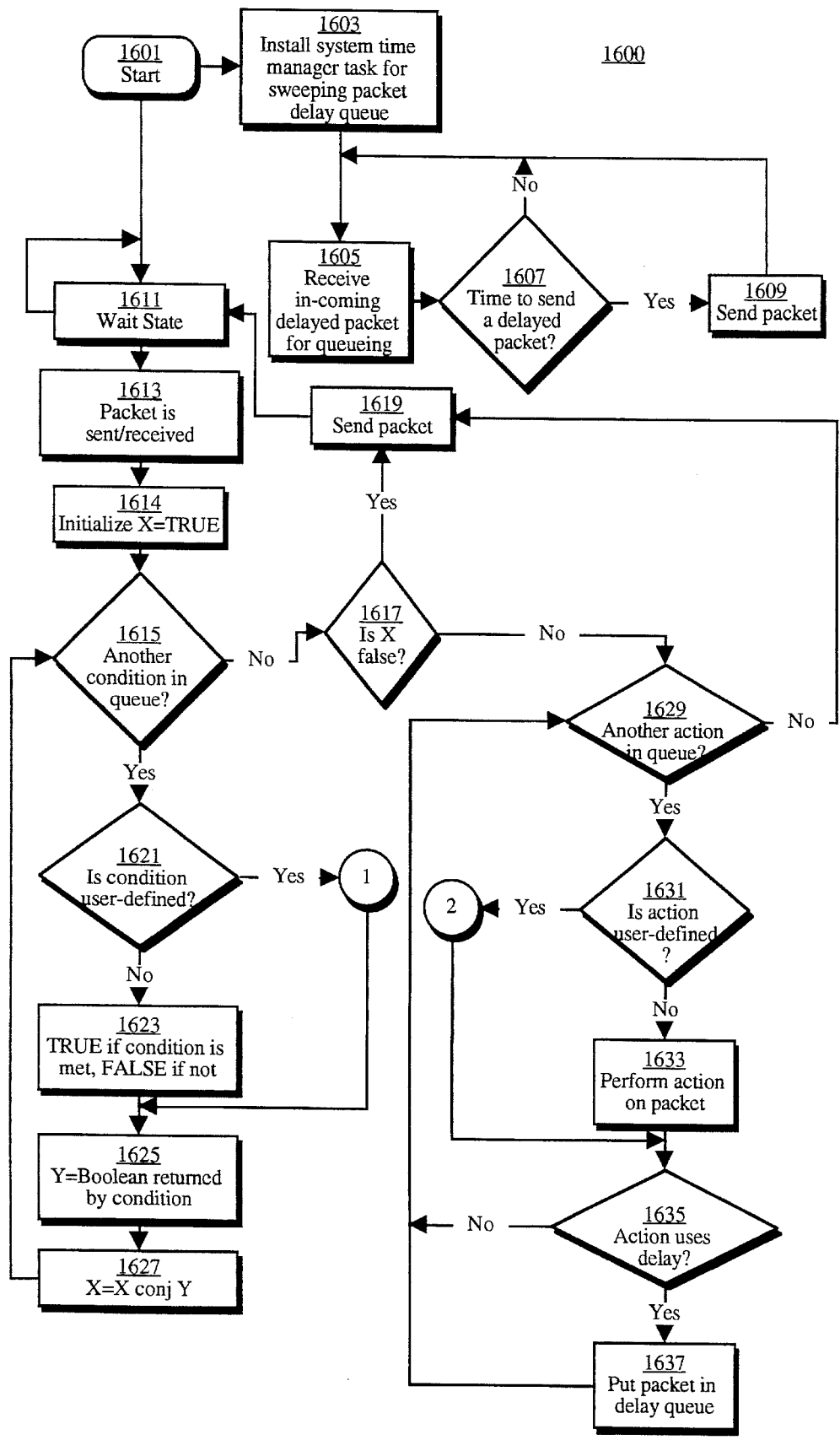
FIGS. 16a shows a portion of a process flow diagram for a process which may be used in the preferred embodiment for intercepting and modifying packets.
Figure 16B:
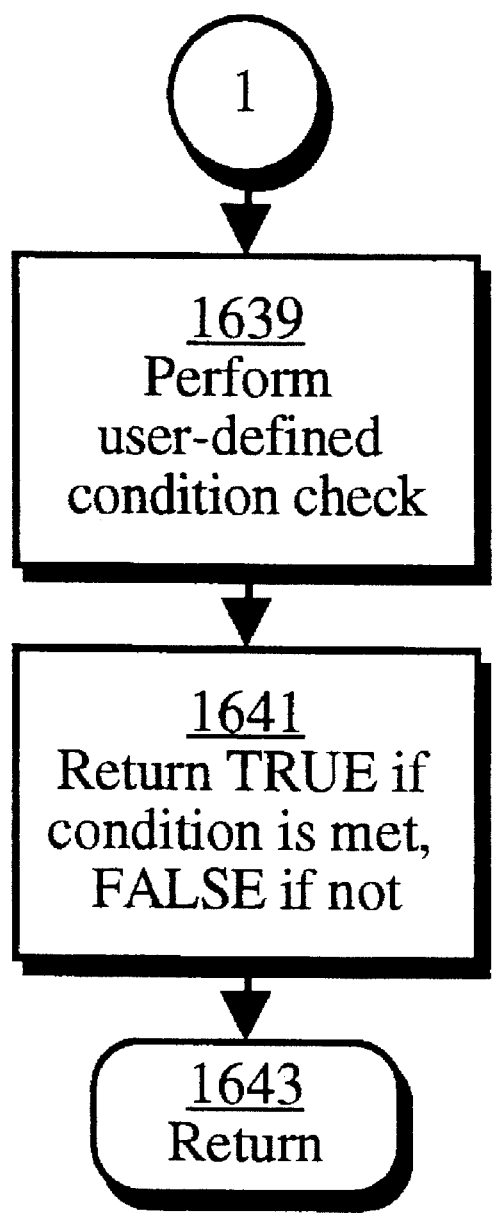

The remaining steps in process 1600 perform various other modifications on the packet and transmit the packet if it is not to be delayed. At step 1611, a wait state is entered wherein the process waits for additional packets to be received or sent by the process. The wait state will be exited from at step 1613 upon the receipt of a packet which is to be sent or received to the higher or lower levels in the ISO-OSI model. At step 1614 the temporary variable X is initialized to "TRUE." At step 1615, it is then determined whether there is another condition in the condition queue. The preferred embodiment utilizes a technique wherein conditions are maintained in a queue in a list wherein each queue element contains a process pointer and various other data pertaining to a particular condition. This will be discussed in more detail below, however, at step 1615, the next condition in the queue element list is accessed. It is determined at step 1621 whether the condition received from the condition queue is a user-defined condition. That is, the condition queue element references a user-defined process which checks various parameters in the packet. If so, then a branch is taken to FIG. 16b to perform the user-defined condition checks. As shown in FIG. 16b, 1639 performs this custom user-defined condition check by referencing the user-defined process which will return a Boolean indicating whether the condition renders a true or false result. At step 1641, the user-defined condition returns true if the condition is met and false if not. Then, a return is made to the main body of the packet interception process shown in FIG. 16a at step 1643.

If, however, the condition was not a custom condition, as determined at step 1621, that is, it is one of the conditions currently supported by the packet interception modification process as described above, then, at step 1623, the condition is set to true if the condition has been met and is set to false if it has not been met. In either the case of a user-defined condition or a condition supported by the packet interception modification process, at step 1625, the temporary variable Y is set equal to the condition returned from either of the user-defined or the supported condition which has been returned. Then, at step 1627, the temporary variable X is set equal to the previous value of X in conjunction with the current value of Y. That is, the current condition is taken with the condition returned from the queue process and generates a new current condition value. Note that either "AND" or "OR" may be used as conjunctions, as was described previously. In addition, note that the current process evaluates Boolean in sequential order, and thus, there is no hierarchical evaluation of AND's or OR's according to normal algebraic Boolean evaluation rules. Note that, in an alternative technique, such a hierarchical evaluation of expressions may be performed. At any rate, at step 1627, the current Boolean X is updated, and process 1600 returns to step 1615 to check for another condition in the condition queue. If there are no more conditions in the condition queue, then process 1600 proceeds to step 1617 wherein the condition will be evaluated and actions perforated if the condition yields a true result.

At step 1617, it is determined whether the condition yielded from the condition portion of the process is true. That is, after evaluating each of the condition elements, whether the net result is false at step 1617. If it is false, then the packet is sent at 1619, and the process returns to the wait state at step 1611. If, however, the condition yielded a true result, then the process branches to step 1629. 1629 determines whether there is another action in the action queue. Again, like conditions discussed previously, actions are stored in a queue with references to each of the processes performing the action in order that packets be modified. These specific queue elements will be discussed in more detail below, however, each of the queue elements contains a reference to subsequent queue elements so that the entire list may be scanned. As was discussed above, any number of actions may be performed upon packets, as are each listed in the queue. If there are other actions in the queue, then, at step 1631, it is determined whether the action is a user defined fashion. If so, then process 1600 branches to step 1645 shown in FIG. 16c.

Figure 16C:
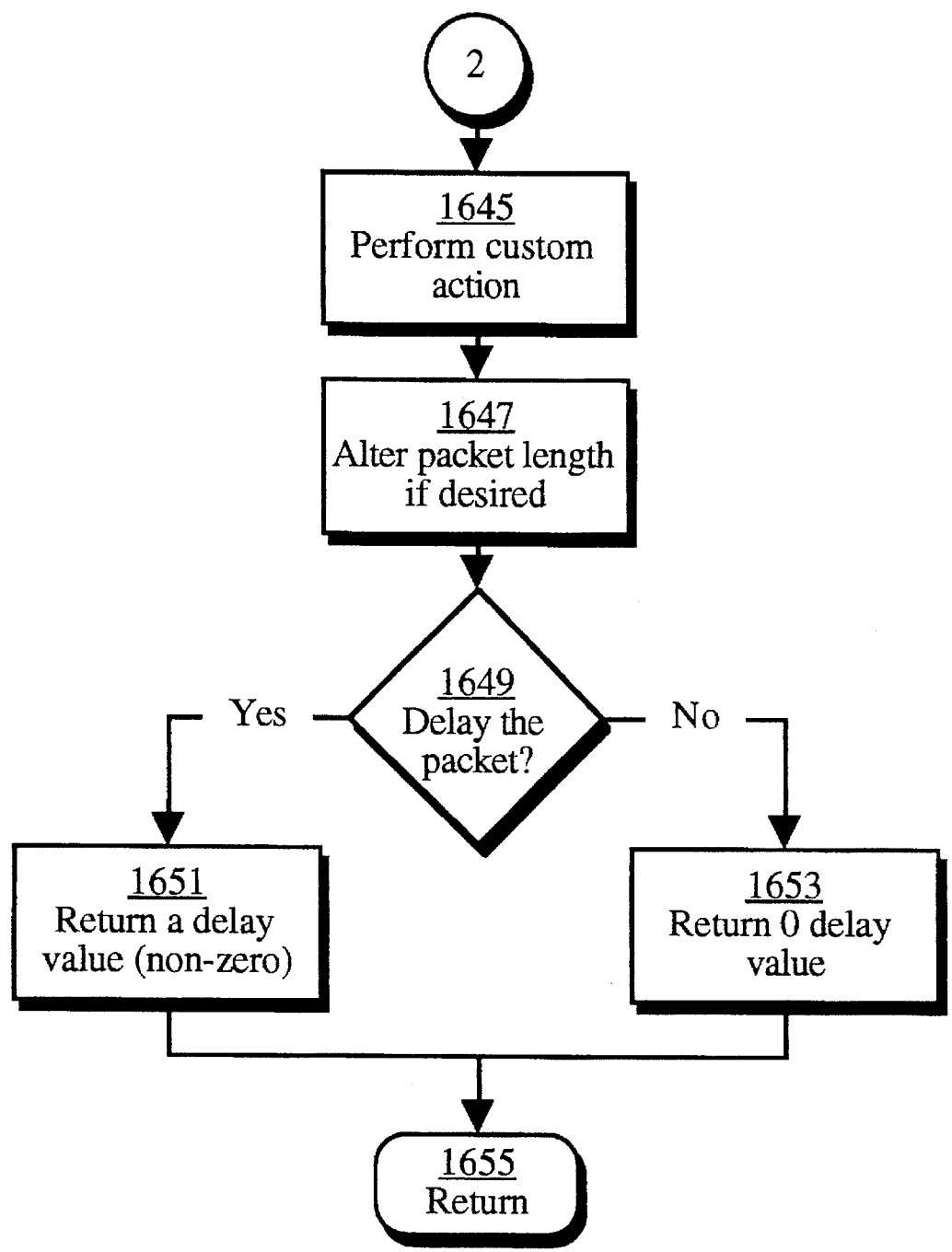

As is shown in FIG. 16c, a custom user action will have steps similar to that shown in FIG. 16c. At step 1645, the custom user action is performed upon the packet. User actions will be discussed in more detail below, however, they may modify any of the data in the packet and alter the packet length if desired at step 1647, for example. Finally, the process returns a value which indicates whether the packet should be delayed or not. This is determined at step 1649. Delay values will be discussed in more detail below, however, it is an integer value indicating that the packet should be delayed a given interval of time. If the value is zero, then the packet is sent immediately. If the value is a nonzero, then the packet is delayed for some fixed interval of time. At step 1651, a nonzero delay value is returned, however, if the packet is desired to be sent immediately, then a zero delay value is returned at step 1653. Then, the user-defined action is returned from at step 1655 to the main body of process 1600 shown in FIG. 16a.

If however, the action is not user-defined, as is determined at step 1631, then one of the supported actions by the process will be performed upon the packet at step 1633. Actions are performed upon the packet by referencing the process which modifies the packet from the queue element. This is similar to that used for condition elements. The reference to the process is taken at step 1633, and the associated action, then, can be performed upon the packet. In either case of a user-defined action or a supported action, it is determined, at step 1635, whether either of the actions need to delay the packet. If so, then the packet is put in the delay queue at step 1637 to be sent at a later time. If, however, the packet is to be transmitted immediately, then 1635 returns back to step 1629 to determine whether there are other action elements in the action queue. Upon the determination of the last action queue element at step 1629, then process 1600 returns to step 1619 which will send the packet with any modifications performed by the various actions generated at steps 1629–1637, and the process will return to the wait state at step 1611. Thus, 1600 continuously executes waiting for packets to be received, checking for conditions which the packets may meet, and performing the associated actions, if such conditions have been met. Thus, incoming and outgoing packets in the computer system upon which the process is being executed may be modified, delayed, or, otherwise, retransmitted to the various levels in the ISO-OSI protocol stack.

Figure 16D:
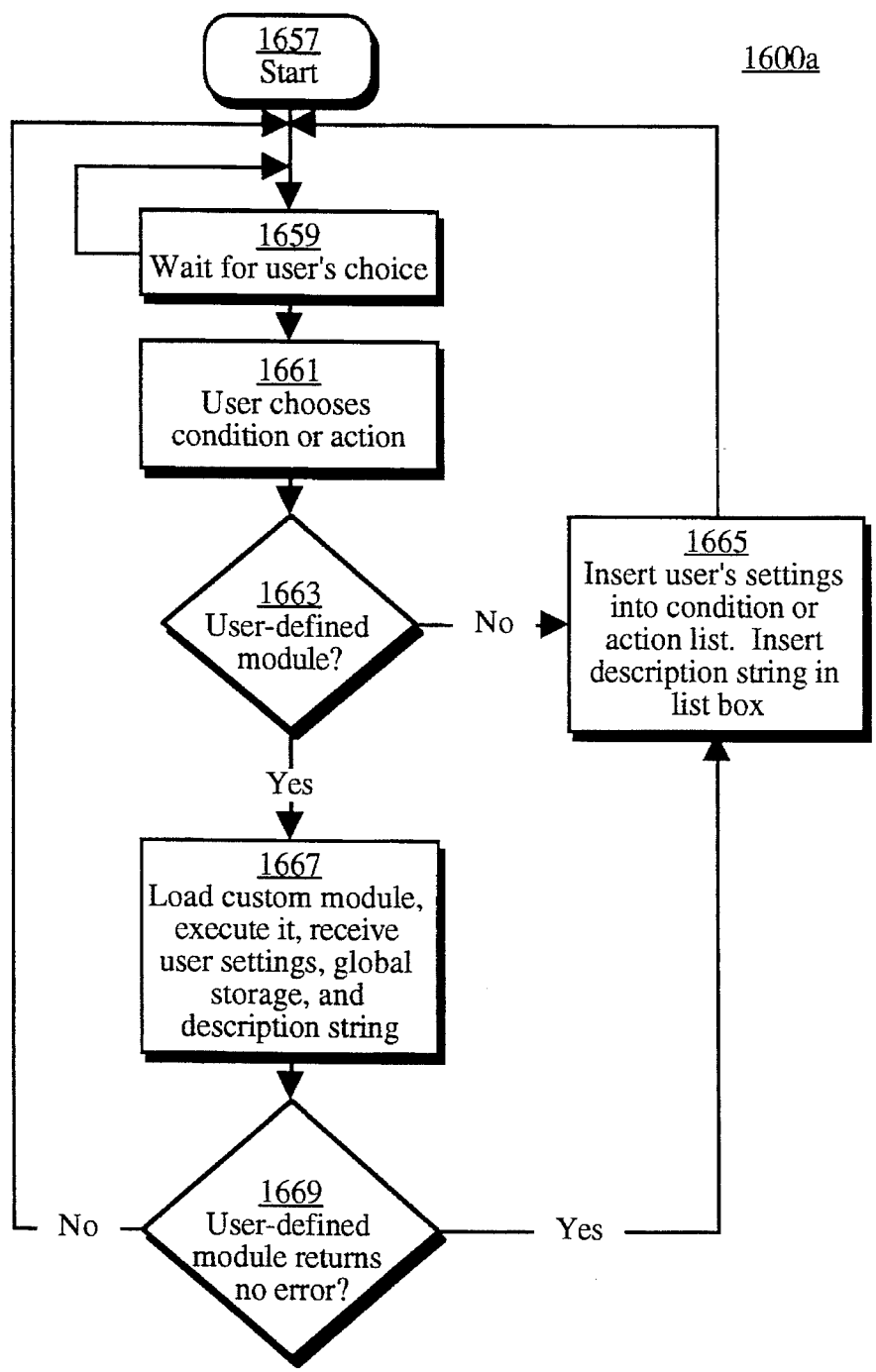
FIG. 16d shows a portion of a process flow diagram for a process performed when a user specifies conditions and actions for which packet modification is required.

1600a of FIG. 16d illustrates a simple set of steps which are taken when a user specifies conditions and actions for which packet modification is required. For example, 1600a starts at entry point 1657 which will display suitable user interface screens, for example, 500 of FIG. 5. Then, using various interface displays, as was described in the figures above, the user may define various conditions and actions which will be used for this session of the interception/modification process. The process, thus, loops waiting for a user's choice at step 1659. The user will then choose either a condition or action item at step 1661. If the condition or action item is a user-defined modules, as is detected at step 1663, then, at step 1667, the custom module may be invoked for this session of the interception/modification process. At step 1667, the user-defined module will be loaded, executed, the user-defined process will provide certain settings and other variables, and the user-specified description string to associate with the module. If there is a error condition determined from the user-defined module at step 1669, then the process returns to the wait state at step 1659. If, however, the module does not return an error condition, then process 1600a returns to step 1665 which inserts the appropriate queue element in the condition or action list along with the description string in the list box (e.g., 501 in FIG. 5). For either user-defined or supported conditions or actions, this step is taken at step 1665 to update list box 501 shown in FIG. 5. Then, process 1600a returns to 1659 for additional user actions.

Another novel feature provided by the interception modification process of the preferred embodiment is that of remote control of nodes executing the process. That is, from a first computer system, a series of commands may be issued across the network to cause a second computer system to intercept and modify packets in a particular manner. This is graphically illustrated with reference to flow diagram 1600b of FIG. 16e. The process which issues the remote commands to the node running the process utilizing any user-generated process. Commands which are able to be issued over the network include the following:

1. Activate the interception/modification process;
2. deactivate the interception/modification process;
3. log the current state of reception modification (e.g., the statistics shown in 502 of window 500);
4. specify initial distribution settings (e.g., those specified in a window such as 700 in FIG. 7);
5. clear statistics (reset all statistics shown in a field such as 502 of FIG. 5); and
6. specify a file containing conditions and actions in the remote node.

Thus, for an automated testing environment, a series of scripts or documents may be created on the node perforating the testing, and statistics may be cleared, current statistics may be logged, or other test scripts may be loaded in order that repetitive testing may be performed on the receiving node. The process which communicates with the interception/modification process of the preferred embodiment can be generated in a suitable programming language on the transmitting computer, sufficient to access the interception/ modification process in the active node.

Communication is provided with the node receiving the command using the AppleTalk transaction protocol 214 which resides at the Transport layer 211 of the ISO-OSI protocol stack. Commands are sent over the network specifying a command as a numeric value (to specify one of the above options) and a file name in the remote node. Thus, log files may be specified, new scripts may be specified, or other actions may be performed. In addition, the command which is received from the remote node includes a distribution parameter block for setting distribution remotely. The remaining parameters transmitted to the remote node are passed in the data portion of the ATP packet. The data portion of the ATP packet is defined by the AppleTalk transaction protocol (ATP) in Inside AppleTalk at pp. 9-1 through 9-28.

Figure 16E:
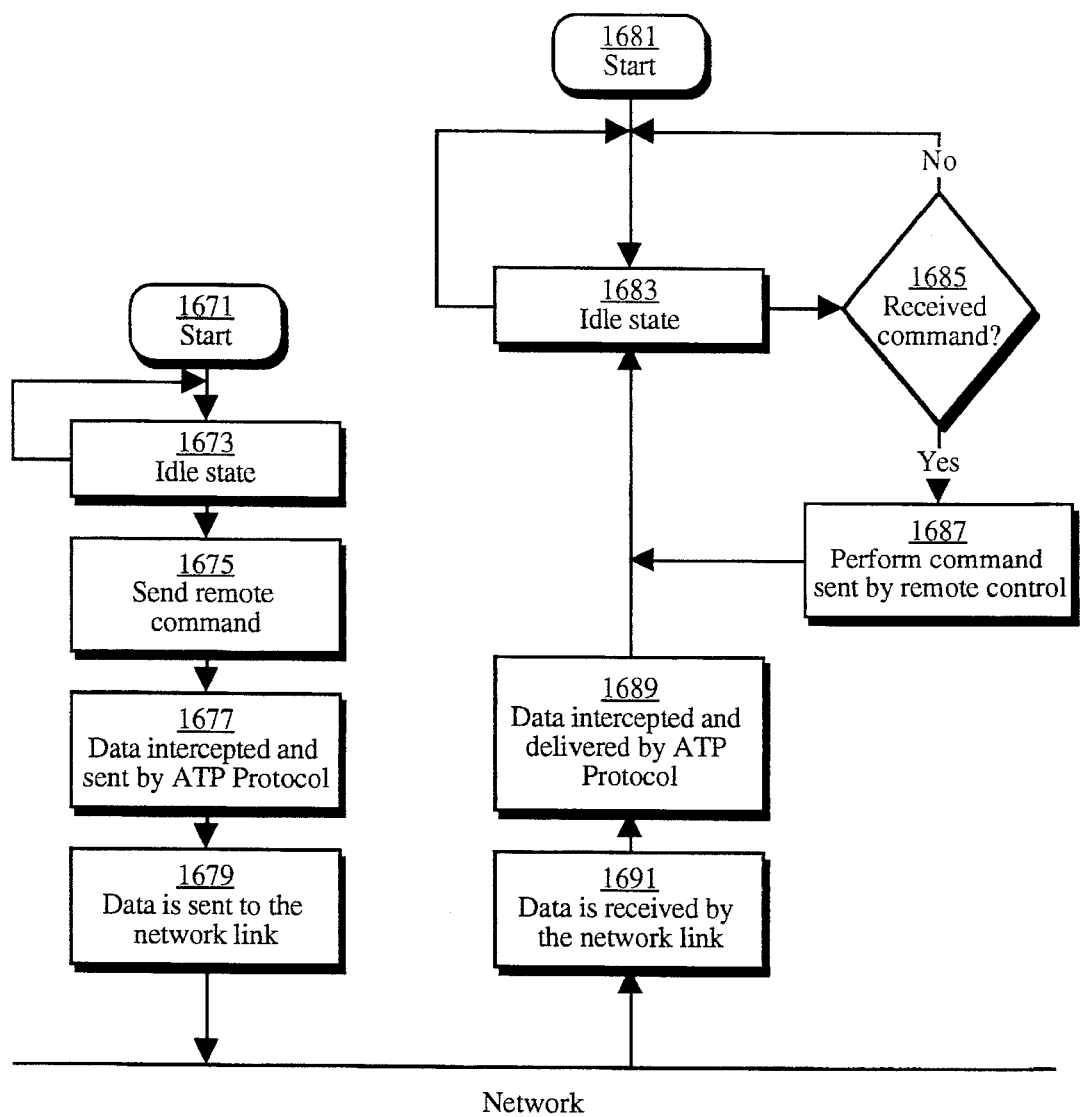
FIG. 16e shows a portion of a process flow diagram for a process in which one computer system causes another computer system to intercept and modify packets in a particular manner.

The flow diagram for this process is shown for the transmitting and receiving nodes as 1600b. The transmitting node is shown implementing steps 1671–1679. The process would start with an entry point 1671 and enter into an idle state at step 1673 waiting for commands to be sent by the transmitting user. Then, at step 1675, a remote command may be transmitted by the remote process. The data is intercepted and packaged by the ATP protocol residing at Transport layer 211 of the ISO-OSI protocol stack at step 1677. Then, the data may be sent to the network link at step 1679. It should be noted that commands sent over the network, as is shown in FIG. 16e, should be carefully defined in such a manner that they do not conflict with current packets being received and modified by the remote node. If so, then, in this preferred embodiment, unexpected results may occur. It is contemplated that, in alternative embodiments, specified packet parameters may be used for such remote commands to prevent the interception modification process from intercepting and modifying remote commands.

The receiving node will operate a process such as that shown at steps 1681–1691. For example, the process entry point may be shown as 1681, and an idle state will be entered into at step 1683 waiting for a next received command. If a command is received., as detected at step 1685, then the command issued by the transmitting node will be performed at step 1687. This is a command which is received by the network link via 1691 and intercepted and delivered by the ATP protocol at step 1689.

Thus, remote control features are described in the preferred embodiment which would allow remote control of the interception/modification process on other nodes in a networking system.

Figure 17:
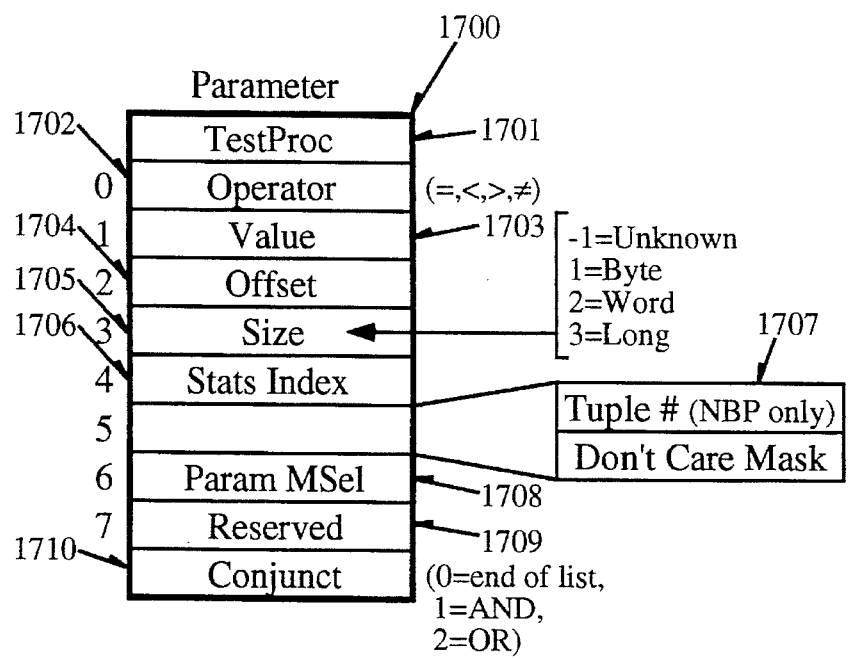
FIG. 17 shows an example parameter queue element which is used for defining a condition in the condition queue.

In the preferred embodiment, conditions are stored in queue elements, as is shown in 1700 of FIG. 17. A user may specify a maximum of 20 of these condition queue elements. They are stored in blocks that contain ten longwords (or 40 bytes). The first longword 1701 holds the address of the routine that performs the condition check on a packet. The next eight longwords (1702–1709) of the packet are used internally to the condition process. Some conditions use only two values and ignore the rest of the elements in the queue element which are marked as "unused." Second longword 1702 holds the operator, which is an ASCII value used as the condition to check against the value specified in field 1703. That is, it may be any of the ASCII values representing the arithmetic operators (=, <, >, or ≠). The next three values are the values specified in field 1703, the offset in the packet of the datum being checked (in bytes) in field 1704, and the size of the value specified in field 1703, which is specified in field 1705. A -1 represents an unknown size value, 1 represents a byte, 2 a word, and 3 a longword. Statistics index field 1706 is used to hold a variable which is used internally within the process of the preferred embodiment. Value 1707 contains either the Tuple number (for a parameter used in the Name Binding Protocol [NBP]) or a "Don't Care" mask value which is used when certain bits in the trait are ignored. Field 1708 holds a value representing a menu selection which the user made when specifying the condition pop-up menu 801 of FIG. 8a. This assists the process in displaying the appropriate dialog when the user double-clicks one of the conditions displayed in list box 803 of FIG. 8a. 1709 is reserved for future use. The remaining longword 1710 in queue element 1700 contains a number that represents the conjunction that is used. For example, the field will contain a zero to specify the end of the list, a 1 for an "AND" conjunction element, and a 2 for an "OR" conjunction element.

Figure 18:
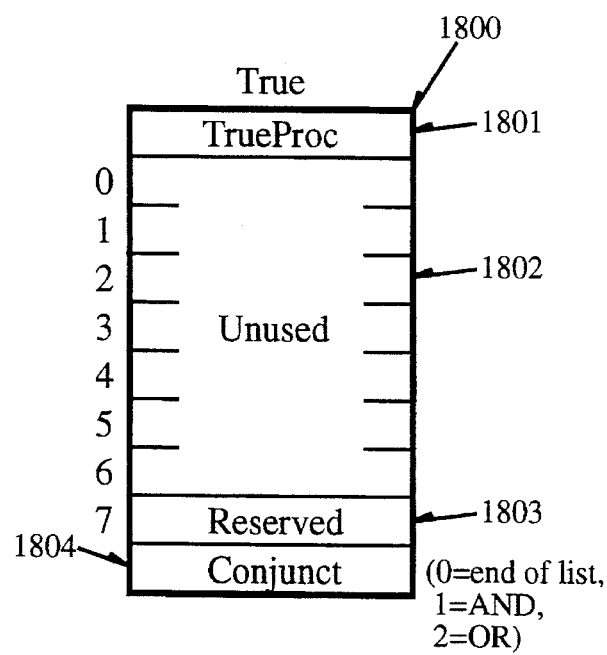
FIG. 18 shows a condition queue element which always returns true.

FIG. 18 shows a queue element 1800 for a process which always the condition "true." This is a simple process which merely refers to a process returning a true condition via process pointer 1801 and the next seven fields 1802 in the queue element are undefined. 1803 is reserved, and 1804 is used for specifying the conjunction with the true process. The true process is shown in 501 of FIG. 5, user interface display.

Figure 19:
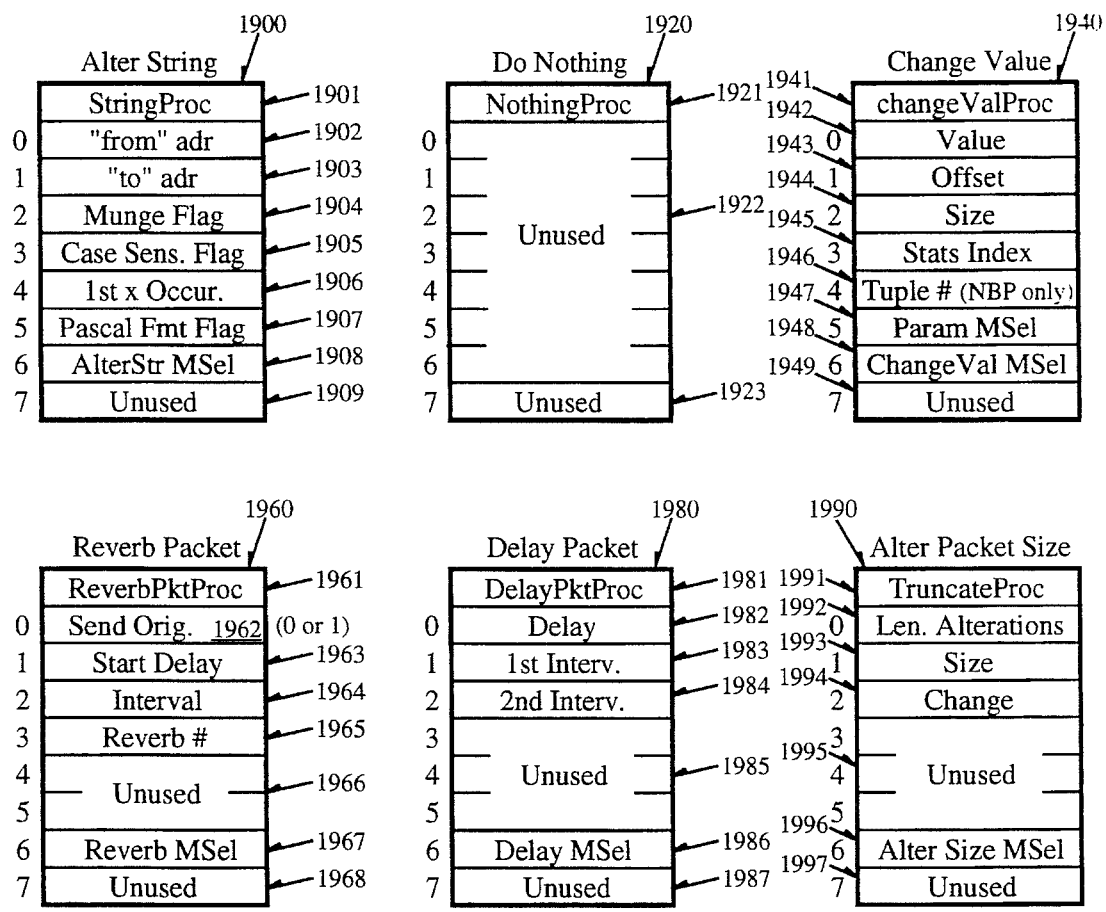
FIG. 19 shows examples action queue elements which are used for specifying actions.

Actions are also stored in queue elements, examples of which are shown in FIG. 19. Like condition elements, a maximum of 20 actions may be specified. Each of them are stored in blocks that contain eight longwords or 32 bytes. Each of the first longwords of each of action elements 1901, 1921, 1941, 1961, 1981, and 1991 all are used for storing the pointer of the process perforating the specified action. Each of the six actions shown in FIG. 19 in queue elements 1900, 1920, 1940, 1960, 1980, and 1990 are used for performing the functions listed therein and which were described in detail above. The remaining eight longwords in each of the queue elements are used internally to the action process. Each of the values contained in the fields of all the action queue elements are integer or numeric values, and have the specific meanings defined in FIG. 19. Some actions use only three values and ignore the rest (marked as unused). The sixth longword in each of the queue elements 1908, 1948, 1967, 1986, and 1996 stores the menu selection the user made when using the action pop-up menu 804 in FIG. 8*a*. This also assists the program in displaying the correct window when the user double-clicks on one of the actions displayed in list box 806 of FIG. 8*a* using the selection device. The remaining longword (e.g. 1909, 1923, 1949, 1968, 1987 and 1997) in each of the queue elements are not used for these actions. As was discussed above, each of the items in the action queue list are separated by an "AND" conjunction since alternative actions are not allowed.

Figure 20:
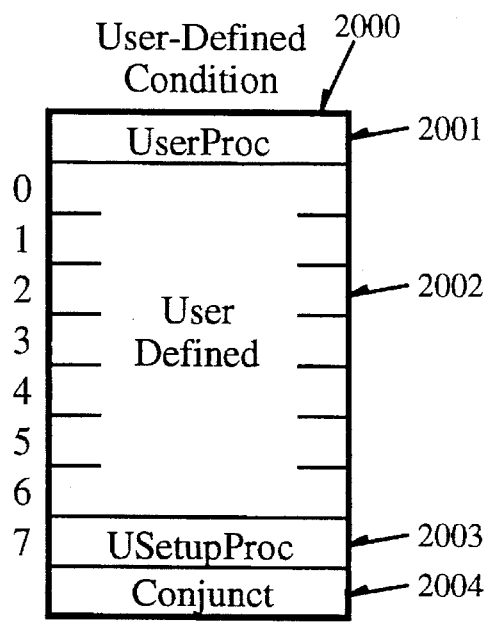
FIG. 20 shows an example of a user-defined condition queue element.

Finally, the preferred embodiment also allows for user-defined conditions and actions which are specified and discussed with reference to FIGS. 20 and 21. FIG. 20 shows user-defined condition queue element 2000 which is used for referring to processes which the user must create and make available to the interception/modification process. A first process pointer 2001 is used for referencing the condition process which is activated at interception/modification runtime. 2003 is used for referring to a set-up process which sets up the condition on the display to allow the user to interact with a user interface and specify the condition. Up to a maximum of seven user values may be specified in fields 2002 of element 2000. This includes any variables which are used by the condition process. In addition, the condition process will return a flag indicating whether the condition yielded a true or false result. Finally, as with the other condition queue elements discussed with reference to FIGS. 17 and 18 above, a conjunction field 2004 is specified which allows the user-defined condition to be used with other conditions in the condition queue. This has the same use as field 1710 of FIG. 17.

Figure 21:
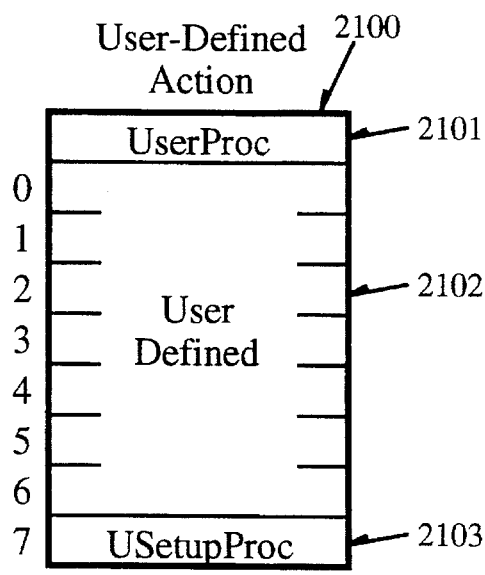
FIG. 21 shows an example user-defined action queue element.

User-defined actions are specified in a similar manner using user-defined action queue element 2100 of FIG. 21. The queue element is similar to that for user-defined conditions specified in a datum such as 2000 of FIG. 20, however, no conjunction field is present. The user-defined action queue element contains a reference to the user-defined process at field. 2101 and a reference to a user-defined set-up process at 2103. Remaining fields 2102 are used for passing various variables to and from the user-defined action process. These include items which are to be displayed on a user dialog which is displayed for user-defined actions.

Thus, an invention for modifying network packets, especially for testing, has been described. Although the present invention has been described particularly with reference to specific data structures, processes, etc. in FIGS. 1–21, it will be appreciated by one skilled in the art that departures and modifications may be made by one of ordinary skill in the art without departing from the general spirit and scope of the present invention.

What is claimed is:

1. A method for selectively modifying packets or the transmission of packets transmitted between a first layer in the ISO/OSI model in a network system and a second layer in the ISO/OSI model in a network system, the first layer in the ISO/OSI model being different from and adjacent to the second layer in the ISO/OSI model, the network system including a first process for translating packets from said first layer in the ISO/OSI model to said second layer in the ISO/OSI model, the packet having a plurality of properties including a packet size, a packet offset and a plurality of packet traits, the method comprising the steps of:

A) receiving from a user a set of user-specified conditions and a user-specified operation associated with a set of user-specified conditions by:

A1) generating a first display of a first plurality of user interface controls for specifying said set of user-specified conditions;

A2) receiving through user interaction with said first plurality of user interface controls user input that specifies said set of user-specified conditions, wherein each of said user-specified conditions designates an arithmetic relationship between a property of packets and a specified value;

A3) generating a second display of a second plurality of user interface controls for specifying said user-specified operation associated with said set of user-specified conditions;

A4) receiving through user interaction with said second plurality of user interface controls user input that specifies said user-specified operation, said user-specified operation being an operation that either modifies the packet or modifies transmission of the packet;

B) causing a second process to execute when an attempt is made to transmit a packet from said first layer in the ISO/OSI model to said second layer in the ISO/OSI model, said second process performing the steps of:

B1) inspecting said packet to determine whether the packet satisfies said set of user-specified conditions;

B2) if said packet satisfies said set of user-specified conditions, then performing a user-specified operation on said packet; and C) invoking said first process after executing said second process.

2. The method of claim 1 wherein said packet initially includes a first set of data, wherein said step of performing said user-specified operation includes replacing said first set of data in said packet with a second set of data.

3. The method of claim 2 wherein said step of performing said user-specified operation comprises modifying data contained in each of the defined protocol traits of the OSI/ISO protocol stacks.

4. The method of claim 1 wherein said step of performing said user-specified operation includes truncating said packet.

5. The method of claim 1 wherein said step of performing said user-specified operation includes increasing the length of said packet.

6. The method of claim 1 wherein said step of performing said user-specified operation includes retransmitting said packet N number of times on said network system.

7. The method of claim 6 wherein said step of retransmitting is timed such that a time t transpires between each retransmission of said packet.

8. The method of claim 7 wherein said step of retransmitting is timed such that a time $t_i$ transpires between an initial transmission of said packet and a first of said N retransmissions of said packet on said network system.

9. The method of claim 1 wherein said method includes the step of receiving input from a user, wherein the input selects plurality of network ports in said network system, wherein the method is performed only on the plurality of network ports selected by the user.

10. The method of claim 1 wherein said steps of receiving through user interaction with said first plurality of user interface controls user input that specifies said set of user-specified conditions and receiving through user interaction with said second plurality of user interface controls user input that specifies said user-specified action include receiving a user-generated script which specifies said user-specified set of conditions and said user-specified operation.

11. The method of claim 1 wherein the first layer is higher in the ISO/OSI model than the second layer.

12. The method of claim 1 wherein the first layer is lower in the ISO/OSI model than the second layer.

13. The method of claim 1 wherein said set of user-specified conditions includes at least one condition that is based on an output of a pseudo random number generator.

14. The method of claim 1 wherein said step of performing said user-specified operation comprises delaying transmission of said packet for a user-specified period of time.

15. A method for selectively modifying packets or transmission between a first layer in the ISO/OSI model and a second layer in the ISO/OSI model in a network system, the first layer in the ISO/OSI model being different from and adjacent to the second layer in the ISO/OSI model, the network system including a first process for translating packets from said first layer in the ISO/OSI model to said second layer in the ISO/OSI model, the network system executing code indicated by an address stored at a predetermined location when an attempt is made to transmit a packet from said first layer in the ISO/OSI model to said second layer in the ISO/OSI model, said address initially indicating the location of a first portion of code corresponding to said first process, the packet having a plurality of properties including a packet size, a packet offset and a plurality of packet traits, the method comprising the steps of:

A) revising said address to indicate the location of a second portion of code corresponding to a second process, wherein revising said address causes said network system to execute said second process when said attempt is made to transmit said packet from said first layer in the ISO/OSI model to said second layer in the ISO/OSI model, said second process performing the steps of:

A1) inspecting said packet to determine whether the packet satisfies a set of user-specified conditions, wherein each of said user-specified conditions designates an arithmetic relationship between a property of said packet and a specified value;

A2) if said packet satisfies said set of user-specified conditions, then performing a user-specified operation on said packet, said user-specified operation being an operation that a user has associated with said set of user-specified condition that either modifies the packet or affects transmission of the packet; and B) invoking said first process after executing said second process.

16. The method of claim 15 wherein said step of invoking said first process after executing said second process includes creating a reference in said second portion of code to said first portion of code.

17. A method for selectively modifying packets or transmission of between a first layer in the ISO/OSI model and a second layer in the ISO/OSI model in a network system, the first layer in the ISO/OSI model being different from and adjacent to the second layer in the ISO/OSI model, the network system including a first process for translating packets from said first layer in the ISO/OSI model to said second layer in the ISO/OSI model, the packet having a plurality of properties including a packet size, a packet offset and a plurality of packet traits, the method comprising the steps of:

A) causing a second process to execute when an attempt is made to transmit a packet from said first layer in the ISO/OSI model to said second layer in the ISO/OSI model, said second process performing the steps of:

A1) inspecting said packet to determine whether the packet satisfies a set of user-specified conditions, wherein each of said user-specified conditions designates an arithmetic relationship between a property of said packet and a specified value;

A2) if said packet satisfies said set of user-specified conditions, then performing a user-specified operation on said packet, said user-specified operation being an operation that a user has associated with said set of user-specified condition that either modifies the packet or affects transmission of the packet; and B) invoking said first process after executing said second process;

wherein said set of user-specified conditions further includes a first condition and a second condition, wherein said first condition is whether said second condition has been satisfied by a user-specified number of packets previously transmitted from said first layer in the ISO/OSI model to said second layer in the ISO/OSI model.

* * * * *